(12) United States Patent
Tatum et al.

(10) Patent No.: US 7,729,618 B2
(45) Date of Patent: Jun. 1, 2010

(54) OPTICAL NETWORKS FOR CONSUMER ELECTRONICS

(75) Inventors: Jimmy A. Tatum, Plano, TX (US); James K. Guenter, Garland, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/468,280

(22) Filed: Aug. 29, 2006

(65) Prior Publication Data

US 2007/0233906 A1    Oct. 4, 2007

Related U.S. Application Data

(60) Provisional application No. 60/712,594, filed on Aug. 30, 2005.

(51) Int. Cl.
H04B 10/00    (2006.01)

(52) U.S. Cl. ............... 398/139; 398/141; 398/138; 398/153

(58) Field of Classification Search ......... 398/135–141, 398/153
See application file for complete search history.

(56) References Cited

U.S. PATENT DOCUMENTS

| | | | | |
|---|---|---|---|---|
| 3,663,822 | A | * | 5/1972 | Uchida ............... 250/551 |
| 3,792,284 | A | * | 2/1974 | Kaelin ............... 250/551 |
| 4,427,879 | A | | 1/1984 | Becher et al. |
| 4,595,839 | A | * | 6/1986 | Braun et al. ............ 250/551 |
| 4,768,188 | A | | 8/1988 | Barnhart et al. |
| 4,902,092 | A | | 2/1990 | Grandy |
| 5,064,299 | A | * | 11/1991 | Hirschmann et al. ........ 385/33 |
| 5,166,761 | A | | 11/1992 | Olson et al. |
| 5,337,398 | A | | 8/1994 | Benzoni et al. |
| 5,341,086 | A | | 8/1994 | Fukudome |
| 5,448,661 | A | * | 9/1995 | Takai et al. ............ 385/24 |
| 5,497,187 | A | | 3/1996 | Banker et al. |

(Continued)

FOREIGN PATENT DOCUMENTS

JP    07-210644    8/1995

(Continued)

OTHER PUBLICATIONS

"Full-Scale Entry of Optical Transmission System Business Begins as Fujifilm Introduces Optical DVI Link System That Utilizes Lumistar, A Graded Index Plastic Optical Fiber—Realizes World's First 30M-Class High-speed Optical Linking of Digital Images Using a Plastic Optical Fiber"; Sep. 8, 2004, (Web Page; 3 pages). http://www.fujifilm.com/news/n040908.html (3 pages).

(Continued)

Primary Examiner—Agustin Bello
(74) Attorney, Agent, or Firm—Workman Nydegger

(57) ABSTRACT

Digital optical networks for communication between digital consumer electronic devices are disclosed. A digital optical network can include an input interface configured to electrically couple to a DVI or HDMI receptacle of a source device. The input interface includes an optical transmitter for converting a TMDS signal into an optical signal. An input optical fiber optically coupled to the optical transmitter receives the optical signal. A coupler is coupled to the input optical fiber and couples the optical signal with at least one of multiple output optical fibers coupled to the coupler. Output interfaces each include an optical transmitter for converting the optical signal back into the electrical TMDS signal. The output interfaces are configured to electrically couple the TMDS signals with respective DVI or HDMI receptacles of DVI or HDMI sink devices.

19 Claims, 21 Drawing Sheets

U.S. PATENT DOCUMENTS

| | | | |
|---|---|---|---|
| 5,515,467 A | 5/1996 | Webb | |
| 5,530,787 A | 6/1996 | Arnett | |
| 5,631,988 A | 5/1997 | Swirhun et al. | |
| 5,668,419 A | 9/1997 | Oktay | |
| 5,732,176 A | 3/1998 | Savage, Jr. | |
| 5,892,784 A | 4/1999 | Tan et al. | |
| 5,907,569 A | 5/1999 | Glance et al. | |
| 5,926,303 A | 7/1999 | Giebel et al. | |
| 6,036,654 A | 3/2000 | Quinn et al. | |
| 6,115,516 A * | 9/2000 | Watson et al. | 385/24 |
| 6,179,627 B1 | 1/2001 | Daly et al. | |
| 6,217,231 B1 | 4/2001 | Mesaki et al. | |
| 6,220,873 B1 | 4/2001 | Samela et al. | |
| 6,267,606 B1 | 7/2001 | Poplawski et al. | |
| 6,446,867 B1 * | 9/2002 | Sanchez | 235/454 |
| 6,458,619 B1 | 10/2002 | Irissou | |
| 6,461,059 B2 | 10/2002 | Ando et al. | |
| 6,478,625 B2 | 11/2002 | Tolmie et al. | |
| 6,502,997 B1 | 1/2003 | Lee et al. | |
| 6,515,308 B1 | 2/2003 | Kneissl et al. | |
| 6,539,147 B1 * | 3/2003 | Mahony | 385/24 |
| 6,540,412 B2 | 4/2003 | Yonemura et al. | |
| 6,553,166 B1 * | 4/2003 | Caldwell | 385/100 |
| 6,588,942 B1 | 7/2003 | Weld | |
| 6,607,307 B2 | 8/2003 | Gilliland et al. | |
| 6,717,972 B2 | 4/2004 | Steinle et al. | |
| 6,755,575 B2 | 6/2004 | Kronlund | |
| 6,758,693 B2 | 7/2004 | Inagaki et al. | |
| 6,774,348 B2 | 8/2004 | Tatum et al. | |
| 6,793,539 B1 | 9/2004 | Lee et al. | |
| 6,806,114 B1 | 10/2004 | Lo | |
| 6,822,987 B2 | 11/2004 | Diaz et al. | |
| 6,905,257 B2 | 6/2005 | Eichenberger et al. | |
| 6,914,637 B1 * | 7/2005 | Wolf et al. | 348/473 |
| 6,920,161 B2 | 7/2005 | Riaziat et al. | |
| 6,941,395 B1 | 9/2005 | Galang et al. | |
| 6,952,395 B1 | 10/2005 | Manoharan et al. | |
| 6,954,592 B2 | 10/2005 | Tan et al. | |
| 6,965,722 B1 | 11/2005 | Nguyen | |
| 7,062,171 B2 * | 6/2006 | Ota et al. | 398/67 |
| 7,065,604 B2 * | 6/2006 | Konda et al. | 710/315 |
| 7,070,425 B2 | 7/2006 | Regen et al. | |
| 7,088,518 B2 | 8/2006 | Tatum et al. | |
| 7,153,039 B2 | 12/2006 | McGarvey et al. | |
| 7,154,921 B2 | 12/2006 | Kitamura et al. | |
| 7,162,130 B2 | 1/2007 | Castellani et al. | |
| 7,170,097 B2 | 1/2007 | Edmond et al. | |
| 7,179,329 B2 | 2/2007 | Boone et al. | |
| 7,217,022 B2 | 5/2007 | Ruffin | |
| 7,269,194 B2 | 9/2007 | Diaz et al. | |
| 7,269,673 B2 | 9/2007 | Kim et al. | |
| 7,277,620 B2 * | 10/2007 | Vongseng et al. | 385/135 |
| 7,373,069 B2 * | 5/2008 | Lazo | 385/134 |
| 7,401,985 B2 | 7/2008 | Aronson et al. | |
| 7,445,389 B2 | 11/2008 | Aronson | |
| 2001/0035994 A1 | 11/2001 | Agazzi et al. | |
| 2002/0018609 A1 | 2/2002 | Schumann | |
| 2002/0044746 A1 | 4/2002 | Kronlund et al. | |
| 2002/0049879 A1 * | 4/2002 | Eyer | 710/305 |
| 2002/0063935 A1 | 5/2002 | Price et al. | |
| 2002/0076157 A1 | 6/2002 | Kropp | |
| 2002/0114590 A1 | 8/2002 | Eichenberger et al. | |
| 2002/0136510 A1 | 9/2002 | Heinz et al. | |
| 2002/0149821 A1 | 10/2002 | Aronson et al. | |
| 2002/0159725 A1 | 10/2002 | Bucklen | |
| 2002/0160656 A1 | 10/2002 | Nishita | |
| 2002/0177362 A1 | 11/2002 | Chang | |
| 2003/0016920 A1 | 1/2003 | Sohmura et al. | |
| 2003/0021580 A1 | 1/2003 | Matthews | |
| 2003/0034963 A1 | 2/2003 | Moon et al. | |
| 2003/0208779 A1 * | 11/2003 | Green et al. | 725/143 |
| 2003/0223756 A1 | 12/2003 | Tatum et al. | |
| 2004/0008996 A1 | 1/2004 | Aronson et al. | |
| 2004/0076119 A1 | 4/2004 | Aronson et al. | |
| 2004/0141695 A1 | 7/2004 | Miller et al. | |
| 2004/0184746 A1 * | 9/2004 | Chang et al. | 385/100 |
| 2004/0208600 A1 | 10/2004 | Guenter et al. | |
| 2004/0252560 A1 | 12/2004 | Hsieh | |
| 2004/0263941 A1 | 12/2004 | Chen et al. | |
| 2005/0036746 A1 | 2/2005 | Scheibenreif et al. | |
| 2005/0053340 A1 | 3/2005 | Toriumi et al. | |
| 2005/0063440 A1 | 3/2005 | Deppe | |
| 2005/0063707 A1 * | 3/2005 | Imai | 398/141 |
| 2005/0063711 A1 | 3/2005 | Rossi et al. | |
| 2005/0078916 A1 | 4/2005 | Hosking | |
| 2005/0105910 A1 | 5/2005 | Light | |
| 2005/0105913 A1 | 5/2005 | Ozeki et al. | |
| 2005/0105915 A1 | 5/2005 | Light | |
| 2005/0180700 A1 * | 8/2005 | Farr | 385/89 |
| 2005/0238358 A1 | 10/2005 | Light | |
| 2005/0249477 A1 | 11/2005 | Parrish | |
| 2005/0286593 A1 | 12/2005 | Guenter | |
| 2005/0286893 A1 | 12/2005 | Horiuchi | |
| 2006/0008276 A1 * | 1/2006 | Sakai et al. | 398/141 |
| 2006/0036788 A1 | 2/2006 | Galang et al. | |
| 2006/0045425 A1 * | 3/2006 | Kanie et al. | 385/47 |
| 2006/0045437 A1 | 3/2006 | Tatum et al. | |
| 2006/0045526 A1 * | 3/2006 | Katayama et al. | 398/71 |
| 2006/0049936 A1 | 3/2006 | Collins et al. | |
| 2006/0067690 A1 * | 3/2006 | Tatum et al. | 398/66 |
| 2006/0077778 A1 * | 4/2006 | Tatum et al. | 369/44.11 |
| 2006/0083518 A1 * | 4/2006 | Lee et al. | 398/155 |
| 2006/0088251 A1 * | 4/2006 | Wang et al. | 385/88 |
| 2006/0093280 A1 | 5/2006 | McColloch et al. | |
| 2006/0142744 A1 | 6/2006 | Boutoussov | |
| 2007/0058976 A1 * | 3/2007 | Tatum et al. | 398/99 |

FOREIGN PATENT DOCUMENTS

| | | |
|---|---|---|
| JP | 08-008818 | 1/1996 |
| JP | 08130508 | 5/1996 |
| JP | 09-162811 | 6/1997 |
| JP | 2000241642 | 9/2000 |
| JP | 2002208896 | 7/2002 |
| JP | 2002-366340 | 12/2002 |
| JP | 2003-163639 | 6/2003 |
| JP | 2003249711 | 9/2003 |
| JP | 2003-332667 | 11/2003 |
| JP | 2004200847 | 7/2004 |
| JP | 2004213949 | 7/2004 |
| JP | 2004241361 | 8/2004 |
| WO | WO03063309 | 7/2003 |
| WO | 2004054139 | 6/2004 |
| WO | WO2004054139 | 6/2004 |

OTHER PUBLICATIONS

U.S. Appl. No. 11/402,106, filed Apr. 10, 2006; Active Optical Cable with Electrical Connector; Lewis B. Aronson et al.
U.S. Appl. No. 11/402,186, filed Apr. 10, 2006; Active Optical Cable Electrical Connector; Lewis B. Aronson et al.
U.S. Appl. No. 11/402,241, filed Apr. 10, 2006; Active Optical Cable Electrical Adaptor; Lewis B. Aronson et al.
U.S. Appl. No. 11/402,161, filed Apr. 10, 2006 Electrical-Optical Active Optical Cable; Lewis B. Aronson et al.
U.S. Appl. No. 11/401,802, filed Apr. 10, 2006; Active Optical Cable with Integrated Power; Lewis B. Aronson et al.
U.S. Appl. No. 11/402,169, filed Apr. 10, 2006; Active Optical Cable with Integrated Retiming; Lewis B. Aronson et al.
U.S. Appl. No. 11/401,803, filed Apr. 10, 2006; Active Optical Cable With Integrated Eye Safety; Lewis B. Aronson.
U.S. Appl. No. 11/470,623, filed Sep. 6, 2006; Laser Drivers for Closed Path Optical Cables; Jim A. Tatum et al.
Article entitled *"Optical DVI—HDCP Extension Cable"* by Opticis, dated Aug. 27, 2003.

Caruso, Jeff; Bandwidth Boom: Making The Connection, *Can Fiber Break Through the Glass Ceiling?* [online] Jul. 13, 1998 [retrieved on Apr. 25, 2005]. Retrieved from the Internet: URL: http://www.internetweek.com/supp/bandwidth/canfiber.htm.

Kanellos, Michael; *Intel Gets Optical With Fibre* [online] Mar. 1, 2004 [retrieved on Apr. 26, 2005]. Retrieved from the Internet: URL: http://news.zdnet.co.uk/0,39020330,39147918,00.htm.

Kannellos, Michael; *Intel Connects Chips With Optical Fiber* [online] Feb. 27, 2004 [ retrieved on Apr. 26, 2005]. Retrieved from the Internet: URL: http://news.zdnet.com/2100-9584_22-5166883.html.

U.S. Appl. No. 10/829,609, filed Apr. 22, 2004, entitled "Compact Optical Transceivers."

"Sandia Develops Vertical Cavity Surface Emitting Laser that Promises to Reduce Cost of Fiber Optics Connections," Sandia National Laboratories, Jun. 6, 2000, available at http://www.sandia.gov/media/NewsRel/NR2000/laser.htm.

*Digital Visual Interface DVI Revision 1.0*, Digital Display Working Group. Apr. 2, 1999.

*High-Definition Multimedia Interface Specification Version 1.1*, HDMI Licensing, LLC. May 20, 2004.

*High-Definition Multimedia Interface Specification Version 1.2*, HDMI Licensing, LLC. Aug. 22, 2005.

Steve Joiner, Open Fiber Control for Parallel Optics, Communication Semiconductor Solutions Division, Mar. 27, 1997, 13, USA.

"IEC 825-1 Eye Safety Classification of Some Consumer Electronic products," A.C. Boucouvalas, Bournemouth University, School of Electronics, Talbot campus, Fern Barrow, Pole, Dorset, BH12 5BB, U.K. E-mail: tbournemouth.ac.uk, 1996 The Institution of Electrical Engineers, printed and published by the IEE, Savoy Place, London WC2R OBL, UK, (Web page; 6 pages).

Digital Visual Interface DVI Revision 1.0, Digital Display Working Group, Apr. 2, 1999.

High-Definition Multimedia Interface Specification Version 1.1, HDMI Licensing, LLC, May 20, 2004.

High-Definition Multimedia Interface Specification Version 1.2, HDMI Licensing, LLC, Aug. 22, 2005.

U.S. Appl. No. 11/009,208, filed Oct. 26, 2007, Notice of Allowance.
U.S. Appl. No. 11/009,208, filed Oct. 1, 2007, Office Action.
U.S. Appl. No. 11/009,208, filed Apr. 3, 2007, Final Office Action.
U.S. Appl. No. 11/009,208, filed Jul. 26, 2006, Office Action.
U.S. Appl. No. 11/009,208, filed Feb. 14, 2006, Office Action.
U.S. Appl. No. 11/198,619, filed Dec. 17, 2008, Office Action.
U.S. Appl. No. 11/198,619, filed Apr. 18, 2008, Final Office Action.
U.S. Appl. No. 11/198,619, filed Nov. 16, 2007, Office Action.
U.S. Appl. No. 11/198,619, filed May 4, 2007, Final Office Action.
U.S. Appl. No. 11/198,619, filed Oct. 11, 2006, Office Action.
U.S. Appl. No. 11/402,106, filed Oct. 20, 2008, Notice of Allowance.
U.S. Appl. No. 11/402,106, filed Apr. 29, 2008, Office Action.
U.S. Appl. No. 11/402,106, filed Dec. 28, 2007, Final Office Action.
U.S. Appl. No. 11/402,106, filed May 7, 2007, Final Office Action.
U.S. Appl. No. 11/402,106, filed Sep. 21, 2006, Office Action.
U.S. Appl. No. 11/402,186, filed Jul. 3, 2007, Final Office Action.
U.S. Appl. No. 11/402,186, filed Oct. 10, 2006, Office Action.
U.S. Appl. No. 11/198,606, filed Jul. 9, 2008, Final Office Action.
U.S. Appl. No. 11/198,606, filed Dec. 31, 2007, Office Action.
U.S. Appl. No. 11/470,623, filed Sep. 9, 2008, Final Office Action.
U.S. Appl. No. 11/470,623, filed Feb. 19, 2008, Office Action.
U.S. Appl. No. 11/401,803, filed Jun. 30, 2008, Notice of Allowance.
U.S. Appl. No. 11/401,803, filed Aug. 24, 2007, Office Action.
U.S. Appl. No. 11/401,803, filed Jul. 11, 2007, Office Action.
U.S. Appl. No. 11/401,802, filed Mar. 20, 2008, Final Office Action.
U.S. Appl. No. 11/401,802, filed Apr. 17, 2007, Office Action.
U.S. Appl. No. 11/402,241, filed Mar. 25, 2008, Office Action.
U.S. Appl. No. 11/402,241, filed Apr. 17, 2007, Office Action.
U.S. Appl. No. 11/402,169, filed Feb. 21, 2008, Final Office Action.
U.S. Appl. No. 11/402,169, filed Jun. 29, 2007, Office Action.
U.S. Appl. No. 11/402,161, filed Mar. 14, 2008, Notice of Allowance.
U.S. Appl. No. 11/402,161, filed Sep. 11, 2007, Office Action.
U.S. Appl. No. 11/402,161, filed May 31, 2007, Office Action.

* cited by examiner

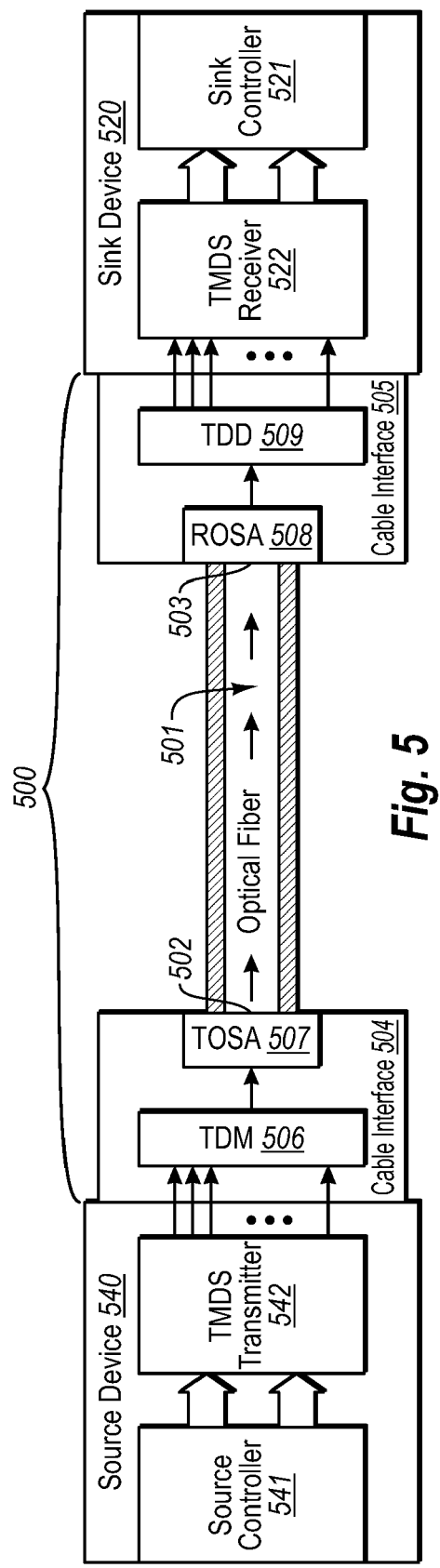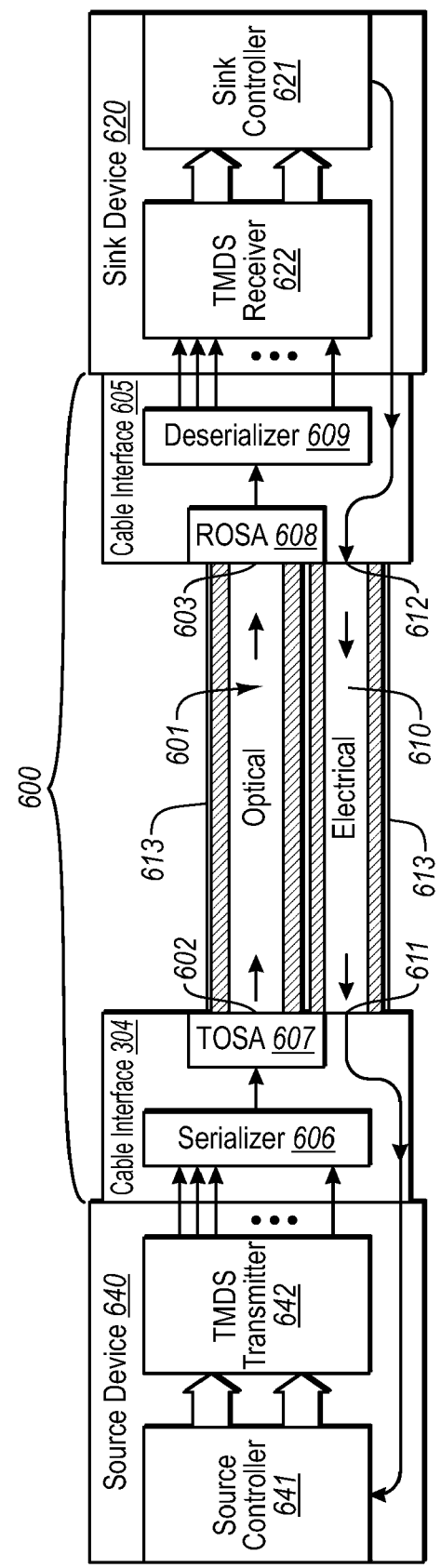

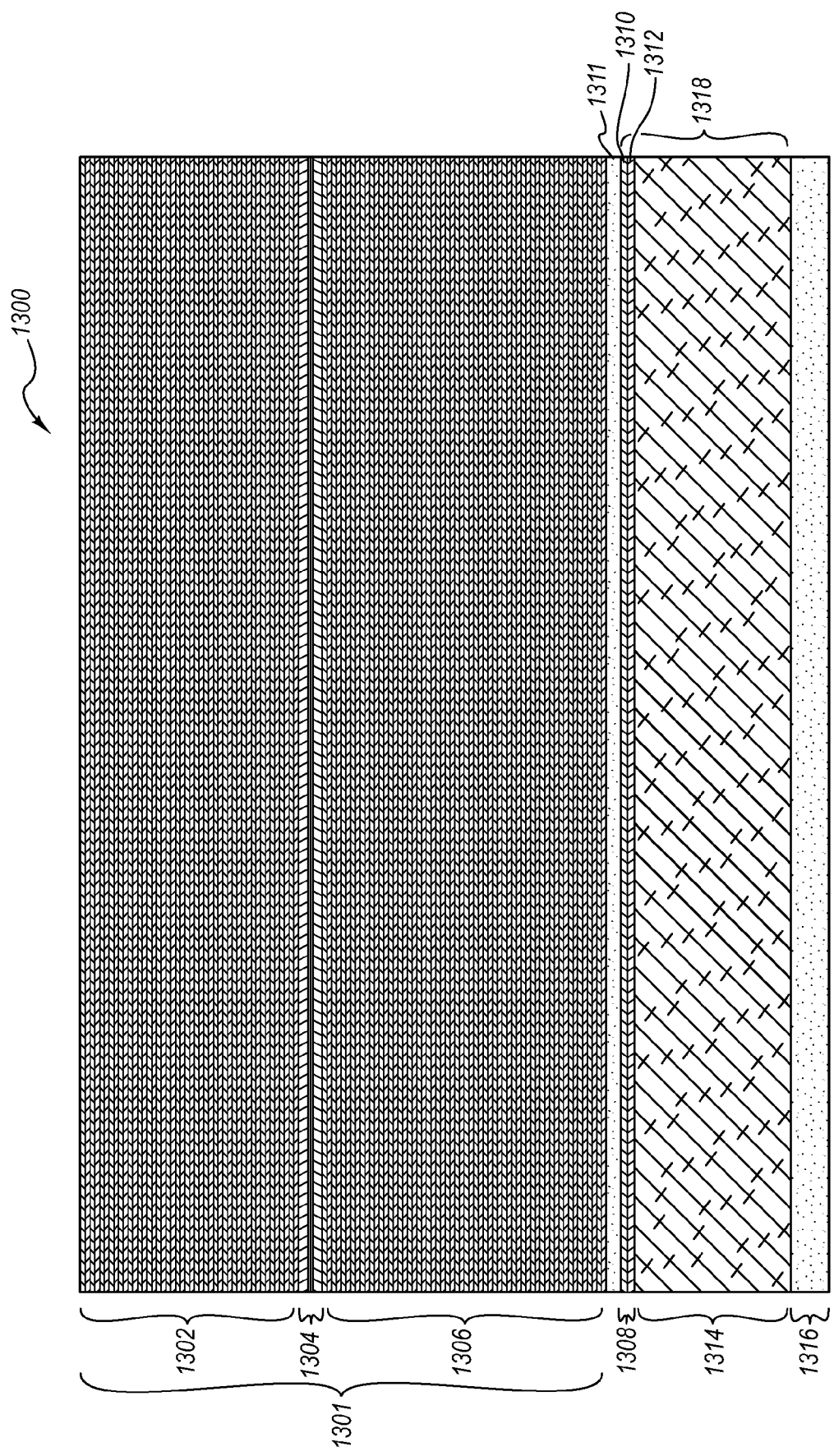

OPTICAL NETWORKS FOR CONSUMER ELECTRONICS

CROSS-REFERENCE TO RELATED APPLICATIONS

This application claims the benefit of U.S. Provisional Patent Application No. 60/712,594 filed Aug. 30, 2005, the contents of which are incorporated by reference herein. This application is related to U.S. patent application Ser. No. 11/198,619 filed on Aug. 5, 2005, entitled "Optical Cables for Consumer Electronics", which claims the benefit of U.S. Provisional Application No. 60/614,199 filed on Sep. 29, 2004 entitled "Optical DVI Cables", the contents of both applications are hereby incorporated herein by reference. This application is related to U.S. patent application Ser. No. 10/316,355 entitled "OPTICAL TRANSCEIVER" filed Dec. 11, 2002, which is a CIP of U.S. patent application Ser. No. 10/163,057, filed Jun. 4, 2002, entitled "OPTICAL TRANSCEIVER", the contents of both applications are incorporated by reference herein. This application is related to U.S. patent application Ser. No. 10/308,308, entitled "BIDIRECTIONAL OPTICAL DEVICE" filed Dec. 3, 2002, the contents of which are incorporated by reference herein. This application is related to U.S. patent application Ser. No. 10/877,915 entitled "LIGHT EMITTING DEVICE WITH AN INTEGRATED MONITOR PHOTODIODE" filed Jun. 25, 2004, the contents of which are incorporated by reference herein. This application is related to U.S. patent application Ser. No. 11/082,521 entitled "LASER PACKAGE WITH DIGITAL ELECTRONIC INTERFACE" filed Mar. 17, 2005, which claims the benefit of U.S. Provisional Application Ser. No. 60/605,781, entitled "LASER WITH DIGITAL ELECTRONIC INTERFACE" filed Aug. 31, 2004, the contents of which are incorporated by reference herein. This application is related to U.S. patent application Ser. No. 10/163,440, entitled "METHOD AND APPARATUS FOR MONITORING THE POWER OF A MULTI-WAVELENGTH OPTICAL SIGNAL" filed Aug. 10, 2004, the contents which are incorporated by reference herein.

BACKGROUND OF THE INVENTION

1. The Field of the Invention

The present invention relates to communication between digital consumer electronic devices. More specifically, the present invention relates generally to video and/or audio data transmission networks between digital consumer electronic devices.

2. The Relevant Technology

Digital consumer electronics, such as digital video displays, digital video disk (DVD) readers, flat screen computer monitors, high definition television (HDTV), digital plasma screens, digital audio readers, digital audio encoders, digital audio amplifiers, and digital audio processing devices have become of increased popularity. As the amount of data transferred between digital components expands to accommodate the desire for greater resolution, size, and quality, the need for high speed data transfer of digital data also increases. Several standards supporting data transfer to digital consumer electronic devices have been developed, but many have not adequately addressed the high bandwidth and high resolution needs of emerging products. These standards have also not fully satisfied the desire to distribute digital video and/or audio data from a source device to multiple sink devices.

Two current standards implemented for transmission of digital video and/or digital audio include the digital video interface (DVI) standard and high definition multimedia interface (HDMI) standard. Both the HDMI standard and the DVI standard are based on transmission minimized differential signaling (TMDS), Silicon Image's high-speed, serial link technology.

DVI Technology

DVI is a display interface developed by the Digital Display Working Group (DDWG). The DVI specification can provide a high-speed digital connection between DVI digital source devices (i.e., DVI digital video processing devices) and DVI digital sink devices (i.e., DVI digital video display devices). One common implementation of DVI is as an interface for a computer having a video controller card and a digital display device (e.g., CRT, LCD, projector) having a display controller. The DVI interface standard and description are contained within the publication entitled *Digital Visual Interface*, Revision 1.0, published by the Digital Display Working Group on Apr. 2, 1999, the contents of which are hereby expressly incorporated herein by reference.

DVI utilizes a high-speed serial interface and TMDS to send data to the DVI sink device. TMDS conveys data by transitioning between "on" and "off" states. An encoding algorithm uses Boolean exclusive OR (XOR) or exclusive NOR (XNOR) operations applied to minimize the transitions to avoid excessive electromagnetic interference (EMI) levels in the DVI cable. An additional operation is performed to balance the DC signal.

The DVI connector has 24 pins that can accommodate up to two TMDS links. The basic TMDS transmission line is made up of three data channels and a clock channel. Data comprise 8-bit pixels in each of three channels (R/G/B). In some instances, a pair of TMDS lines may be used to achieve higher data rates. In addition to the TMDS data channels and clock channels, the digital interface includes a 5 VDC power source, and a hot plug detect channel. The DVI-I combined digital and analog pin assignments are similar to the DVI-D digital only interface pin assignments, but further includes several pins for transmission of an analog signal.

FIG. 1 illustrates the typical flow of data from a graphics controller 120 of a DVI source device 125, such as a digital video processing device, through the TMDS links 130 and to the display controller 135 of a DVI sink device 140, such as a digital video display device. In this process, incoming 8-bit data are encoded into 10-bit transition-minimized, DC-balanced characters. The first eight bits are encoded data, and the ninth bit identifies whether the data was encoded with XOR or XNOR logic; the tenth bit is used for DC balancing.

Due to the defined properties of the DVI interface, DVI cables having copper electrical cables may be limited to a length of about 3-5 meters. This limited length reduces the number of potential applications that can utilize DVI cables. For example, the length limits remote placement of digital video devices and distribution to multiple digital video devices.

Typical DVI cables having copper electrical links are also limited in bandwidth and data transfer rates. DVI data rates typically range from 22.5 mega pixels per second (Mpps) to 165 Mpps (up to 1.65 Giga bits per second). Because TMDS conveys data by transitioning between "on" and "off" states, electromagnetic interference (EMI) levels in the DVI cable can also limit the speed at which data may be transferred.

Further, although DVI is a standard interface, some digital video processors and digital video displays may be incompatible or incapable of interoperation with one another. Thus, at least in some environments, bidirectional communication for reconfiguring a digital video processor and/or digital video display would be desirable. Unfortunately, configuration data are typically not transmitted. Further, many DVI interfaces lack sufficient connectivity to transmit data (e.g., configuration data) from the digital video display (or multiple digital video displays) to the digital video processor. As a result, a digital video processor and a digital video display (or displays) can remain incompatible.

HDMI Technology

HDMI is backward compatible with PCs, displays, and consumer electronics devices incorporating the DVI standard. HDMI is based on the TMDS serial link technology. HDMI technology supports standard, enhanced, or high-definition video, plus multi-channel digital audio on a single cable. It transmits ATSC HDTV standards and supports 8-channel digital audio with 5 Gigbits per second (Gbps) of bandwidth. The HDMI technology, functionality, and hardware is disclosed in the *High-Definition Multimedia Interface* specification Version 1.1, May 20, 2004, by HDMI Licensing, LLC, the contents of which are hereby expressly incorporated by reference herein in its entirety.

The HDMI interface is provided for transmitting digital television audiovisual signals from DVD players, set-top boxes and other audiovisual source devices to HDMI sink devices, such as television sets, projectors and other audiovisual devices. HDMI can carry multi-channel audio data and can carry standard and high definition consumer electronics video formats. Content protection technology is also available. HDMI can also carry control and status information in both directions.

Referring to FIG. 2, an HDMI block diagram is shown where a standard HDMI cable includes four differential pairs 201-204 that make up the TMDS data and clock channels, referred to collectively as HDMI TMDS links 200. These data channels are used to carry video, audio and auxiliary data. In addition, the HDMI cable carries a VESA DDC channel 205. The DDC channel 205 is used for configuration and status exchange between a HDMI source 210 and a HDMI sink 215. The optional CEC protocol line 220 provides high-level control functions between all of the various audiovisual products in a user's environment.

Audio, video and auxiliary data are transmitted across the three TMDS data channels 201-203. Video pixel clock data are transmitted on the TMDS clock channel 204 and are used by an HDMI receiver 230 as a frequency reference for data recovery on the three TMDS data channels 201-203. Video data are carried as a series of 24-bit pixels on the three TMDS data channels 201-203. TMDS encoding converts the 8 bits per channel into a 10-bit, DC-balanced, transition minimized sequence which is then transmitted serially across the HDMI TMDS data channels 201-203 at a rate of 10 bits per pixel clock period. Video pixel rates can range from 25 MHz to 165 MHz. The video pixels can be encoded in either RGB, YCBCR 4:4:4 or YCBCR 4:2:2 formats.

In order to transmit audio and auxiliary data across the TMDS channels 201-203, HDMI uses a packet structure. In order to attain higher reliability of audio and control data, these data are protected with an error correction code and are encoded using a special error reduction coding to produce the 10-bit word that is transmitted. Optionally, HDMI can carry a single such stream at sample rates up to 192 kHz or two to four such streams (3 to 8 audio channels) at sample rates up to 96 kHz. HDMI can also carry compressed (e.g., surround-sound) streams. The DDC channel 205 is used by the HDMI source device 210 to read the HDMI sink device's 215 Enhanced Extended Display Identification Data (E-EDID) to discover the sink device's 215 configuration and/or capabilities. The HDMI source device 210 reads the sink device's 215 E-EDID and delivers only the audio and video formats that are supported by the sink device 215. In addition, the HDMI sink device 215 can detect InfoFrames and process the received audio and video data appropriately.

A digital consumer device's external HDMI connection is embodied by two specified HDMI connectors, Type A or Type B. These connectors can be attached directly to the device or can be attached via a cable adapter that is shipped with the device. The Type A connector carries all required HDMI signals, including a single TMDS link. The Type B connector is slightly larger and carries a second TMDS link, which is necessary to support very high-resolution computer displays requiring dual link bandwidth. A passive cable adapter between Type A and Type B connectors is specified.

The CEC protocol line 220 is optionally used for higher-level user functions such as automatic setup tasks or tasks typically associated with infrared remote control usage. The Type A connector carries only a single TMDS link and is therefore only permitted to carry signals up to 165 Mpps. To support signals greater than 165 Mpps, the dual-link capability of the Type B connector is used.

The input stream to the HDMI source's transmitter 235 from the HDMI source's controller 240 will contain video pixel, packet and control data. The packet data can include audio and auxiliary data and associated error correction codes. These data items are processed in a variety of ways and are presented to the HDMI source's transmitter 235 as either 2 bits of control data, 4 bits of packet data or 8 bits of video data per TMDS channel. The HDMI source's controller 240 encodes one of these data types or encodes a Guard Band character on any given clock cycle. The stream of TMDS characters produced by the transmitter 235 is serialized for transmission on the TMDS data channels 201-203.

These current cables and solutions, as well as others, are limited in many ways in their capabilities to carry digital video and/or audio signals. For example, these digital video and/or audio cables are limited in bandwidth and distance in which they can carry TMDS signals. One solution to the problem of limited length of these cables is a repeater, which is a device with a retransmission function for extension or distribution of digital video and/or audio signals from cables such as DVI and HDMI cables. The circuitry of a repeater can retrieve, equalize, amplify, and re-transmit the digital video and/or digital audio signals into another length of cable. A repeater may be capable of transmitting digital video and/or audio signals to about 25 or 35 meters in some instances. However, a repeater can be quite expensive, add additional hardware and circuitry, require additional cables for the extension, and even still be relatively limited in distances to which the repeater can transmit digital video, number of sinks to which the signal can be distributed, and/or audio signals and bandwidth of the cables. Therefore, repeaters have not provided a desired solution to many of the problems currently experienced with these cables, but rather have tried to mitigate the limitations of such cables.

Thus, for these reasons, as well as others, there is a need to improve communication between digital source devices and digital sink devices.

SUMMARY OF THE INVENTION

The present invention relates to networks for communication between digital consumer electronics. A digital optical network is described. The digital optical network includes an input interface configured to electrically couple to a DVI or HDMI receptacle of a DVI or HDMI source device. The input interface includes an optical transmitter configured to convert an electrical transition minimized differential signaling (TMDS) signal into an optical signal and an input optical fiber, optically coupled to the optical transmitter, to receive the optical signal. The digital optical network includes a coupler configured to optically couple the optical signal with at least one of multiple output optical fibers optically coupled to the coupler. The digital optical network includes at least two output interfaces configured to electrically couple to a DVI or HDMI receptacle of at least two respective DVI or HDMI sink devices. Each of the at least two output interfaces includes an optical receiver configured to receive and convert the optical signal back into the electrical TMDS signal and transmit the electrical TMDS signal to a respective one of the DVI or HDMI sink devices.

A digital optical network for coupling a digital video source device with multiple digital video sink devices is described. The digital optical network includes an input optical fiber having a first end and a second end. The digital optical network further includes an input interface configured to receive input electrical video signals from the digital video source device, the input interface comprising an optical transmitter configured to receive the input electrical video signals and convert the electrical video signals to input optical signals, the optical transmitter further configured to transmit the input optical signal onto the first end of the input optical fiber. The digital optical network further includes a coupler coupled to the input optical fiber and at least two output optical fibers, the coupler configured to couple the optical signal with at least one of the at least two output optical fibers. Each output optical fiber is coupled to an output interface, each output interface comprising an optical receiver configured to receive the optical signal from a respective one of the at least two output optical fibers and convert the optical signal to an output electronic video signal and transmit the output electronic video signal to a respective one of the multiple digital video sink devices.

A nexus for coupling an input DVI or HDMI cable with at least two output DVI or HDMI cables is described. The nexus includes an input DVI or HDMI interface including DVI or HDMI connectors. The input DVI or HDMI interface is configured to receive TMDS signals from the input DVI or HDMI cable. The nexus further includes at least two output DVI or HDMI interfaces including DVI or HDMI connectors. The at least two output DVI or HDMI interfaces are configured to ??SEND?? TMDS signals to the output DVI or HDMI cables.

These and other aspects will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5 illustrates a digital optical cable according to an example embodiment of the present invention;

FIG. 6 illustrates a digital optical cable according to an example embodiment of the present invention;

FIG. 13 illustrates a bidirectional optical device with an integrated monitor photodiode for use in a digital optical cable according to an example embodiment of the present invention;

DETAILED DESCRIPTION OF THE PREFERRED EMBODIMENTS

The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention.

1. Illustrative Digital Optical Cables

Figure 3:
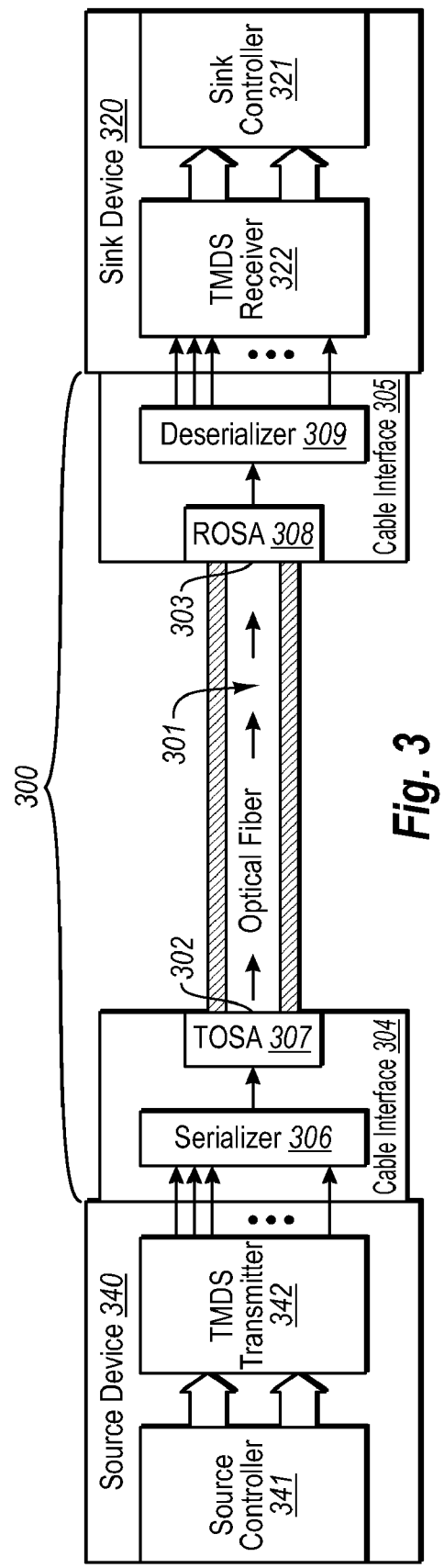
FIG. 3 illustrates a digital optical cable according to an example embodiment of the present invention.

Referring to FIG. 3, a digital optical cable 300 is shown illustrating an example embodiment. The digital optical cable 300 can comprise an optical fiber 301 having a first end 302 and a second end 303. A first interface 304 is coupled to the first end 302 of the optical fiber 301, and a second interface 305 is coupled to the second end 303 of the optical fiber 301.

As shown in FIG. 3, the first interface 304 of the digital optical cable 300 is coupled to a digital source device 340 such as a DVI or HDMI digital video and/or audio processing device. The digital source device 340 includes a source controller 341 and a TMDS transmitter 342. The second interface 305 of the digital optical cable 300 is coupled to a digital sink device 320, such as a DVI or HDMI digital video display and/or audio output device. The digital sink device 320 includes a TMDS receiver 322 and a sink controller 321.

The first interface 304 of the digital optical cable 300 can include a serializer 306, such as an electronic serializer circuit, and a means for converting an electrical signal to an optical signal, such as a transmit optical subassembly (TOSA) 307. The serializer 306 may be an electrical serializer circuit that receives the electrical TMDS signals (the number of TMDS signals depends on the standard) from the TMDS transmitter 342 and serializes the TMDS signals into a single electrical signal. The TOSA 307 can include an optical transmitter, such as a light emitting diode (LED) or a laser diode (e.g., a VCSEL), that receives the electrical serialized data signal from the serializer 306 and converts the electrical serialized data signal into an optical serialized data signal for transmission onto the optical fiber 301.

The second interface 305 of the digital optical cable 300 includes a means for receiving the optical signal and converting the optical signal to an electrical signal, such as a receive optical subassembly (ROSA). The ROSA 308 can include an optical receiver, such as a photodiode, that receives the optical serialized data signal from the optical fiber 301 and converts the optical serialized data signal to an electrical serialized data signal. A deserializer 309 may be an electrical deserializer circuit that receives the electrical serialized data signal from the ROSA 308 and deserializes the electrical serialized data signal into TMDS signals (the number of TMDS signals will depend on the standard) for transmission to the TMDS receiver 322 of the digital sink device 320.

In operation, the digital source device 340 (e.g., a DVD player, digital cable box, or computer) is connected to the first interface 304 of the digital optical cable 300. The second interface 305 of the digital optical cable 300 is connected to the sink device 320 (e.g., a digital television, digital audio system, or a digital monitor).

To display a digital video image or play digital audio on the digital sink device 320, the source controller 341 of the digital source device 340 transmits data signals, such as pixel data, audio data, and/or control data, to the TMDS transmitter 342, which converts the data signals into the TMDS data signal format for a particular standard (e.g., DVI or HDMI). The TMDS transmitter 342 transmits the TMDS data signals to the serializer 306. The serializer 306 receives the TMDS signals and serializes the TMDS signals into a single electrical serialized data signal. The serializer 306 transmits the electrical serialized data signal to the TOSA 307. The TOSA 307 converts the electrical serialized data signal to an optical serialized data signal and transmits the optical serialized data signal to the optical fiber 301.

The optical serialized data signal is received by the ROSA 308 of the second interface 305 and the ROSA 308 converts the optical serialized data signal back to an electrical serialized data signal. The ROSA 308 transmits the electrical serialized data signal to a deserializer 309, which deserializes the electrical serialized data signal back into several TMDS signals depending on the standard used by the digital sink device 320 (e.g., DVI or HDMI). The deserializer 309 transmits the TMDS signals to a TMDS receiver 322 located on the digital sink device 320. The TMDS receiver 322 converts the TMDS signals to video and/or audio data signals, such as pixel data, audio data, and/or control data, and the signals are output to the sink controller 321 of the digital sink device 320.

Figure 4:
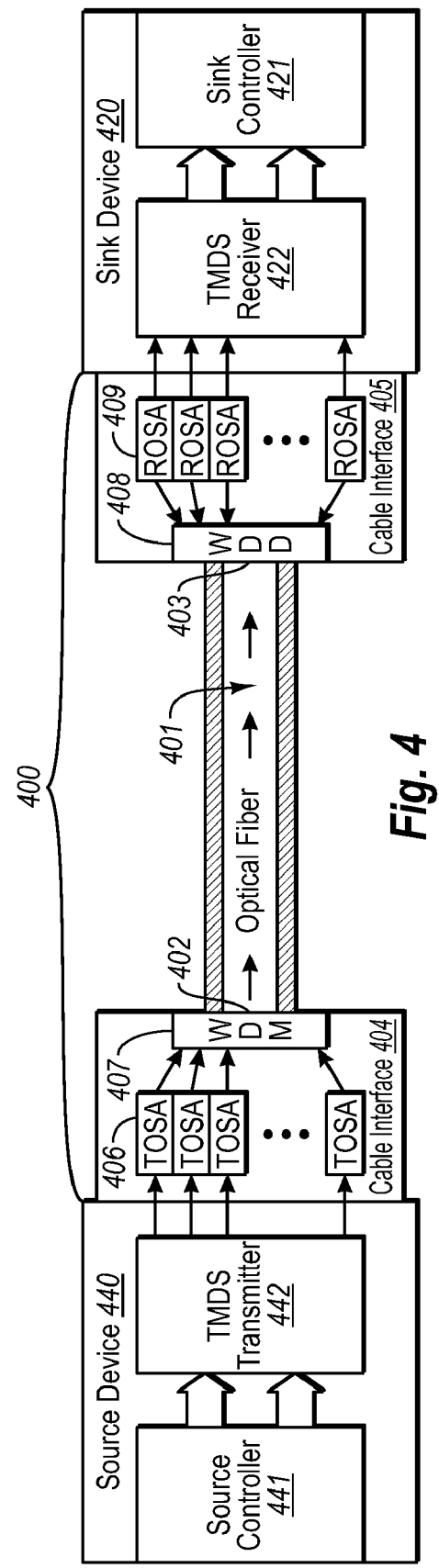
FIG. 4 illustrates a digital optical cable according to an example embodiment of the present invention.

Referring now to FIG. 4, a digital optical cable 400 is shown according to another example embodiment of the present invention. According to the embodiment shown in FIG. 4, a first interface 404 can include a plurality of TOSAs (or transmit chips) 406 and a wavelength-division multiplexer (WDM) 407. Wavelength-division multiplexing combines beams of light from different wavelengths into a single optical transmission to be received by an optical fiber. A second interface 405 includes a wavelength-division demultiplexer (WDD) 408 and a plurality of ROSAs (or receiver chips) 409. The WDD 408 separates a multiplexed beam into separate beams of light of different wavelengths In operation, the digital source device 440 is connected to the first interface 404 of the digital optical cable 400. The second interface 405 of the digital optical cable 400 is connected to the digital sink device 420. The source controller 441 of the source device 440 produces data signals, such as pixel data, audio data, and/or control data. The data signals are transmitted to the TMDS transmitter 442, which converts the data signals into the TMDS data signal format (conforming to the applicable standard, e.g., DVI or HDMI). The TMDS transmitter 442 transmits the TMDS data signals to the plurality of TOSAs 406, one TOSA receiving each TMDS data signal. The TOSAs 406 each include an optical transmitter, such as a laser or LED. Each TOSA 406 transmits light at a slightly shifted wavelength from the other TOSAs 406. The TOSAs 406 convert the electrical TMDS signals to optical signals and transmit the optical signals to the WDM 407. The WDM 407 receives the optical signals and combines the optical signals from the different transmitters (each at a different wavelength) into a multiplexed optical signal, and transmits the multiplexed optical signal onto a first end 402 of the optical fiber 401.

The multiplexed optical signal is received from the second end 403 of the optical fiber 401 by the WDD 408 of the second interface 405. The WDD 408 separates the individual wavelengths transmitted and guides the separate optical TMDS signals to the appropriate one of the ROSAs 409. Each of the ROSAs 409 includes an optical receiver that converts the optical TMDS signals back to an electrical TMDS signal. The ROSAs 409 transmit the electrical TMDS signals to a TMDS receiver 422 located on the sink device 420. The TMDS receiver 422 converts the TMDS signals to video display and/or audio data signals, such as pixel data, audio data, and control data, and the data are output to the sink controller 421 of the sink device 420.

Referring now to FIG. 5, a digital optical cable 500 is shown according to another example embodiment of the present invention. According to the embodiment shown in FIG. 5, the digital optical cable 500 uses time-division multiplexing to transmit the TMDS signals across an optical fiber 501 having a first end 502 and a second end 503.

Time-division multiplexing is digital multiplexing in which two or more apparently simultaneous channels are derived from a single optical spectrum by interleaving pulses. Therefore each channel is allocated access to the optical transmission link in sequential intervals. For example, a similar method is a packet switched transmission which may be particularly advantageous in HDMI optical cables. The first interface 504 includes a time division multiplexer (TDM) 506 and a TOSA 507. The second interface 505 includes a ROSA 508 and a time division demultiplexer (TDD) 509.

In operation, the source controller 541 of the digital source device 540 produces data signals (e.g., pixel, audio, and/or control data signals). The data signals are transmitted to the TMDS transmitter 542, which converts the data signals into the TMDS data signal format. The TMDS transmitter 542 transmits the TMDS data signals to the TDM 506. The TDM 506 receives the TMDS signals and interleaves the signals for sequential transmission to the TOSA 507. The TOSA 507 receives the interleaved signals, converts the electrical signals transmitted from the TDM 507 into optical signals, and transmits the optical signals to the optical fiber 501.

The optical signals are received by the ROSA 508 of the second interface 505. The ROSA 508 includes an optical receiver that converts the optical signals back to electrical signals and transmits the electrical signals to the TDD 509. The TDD 509 separates the received electrical signals transmitted into TMDS signals (e.g., based on a field), and transmits the separate TMDS signals to the TMDS receiver 522 located at the digital sink device 520. The TMDS receiver 522 converts the TMDS signals into video and/or audio data signals, and the data signals are output to the sink controller 521 of the digital sink device 520.

Referring now to FIG. 6, a bidirectional digital optical/electrical cable 600 is shown according to another example embodiment of the present invention. The digital optical/electrical cable 600 comprises an optical fiber 601 having a first end 602 and a second end 603, and an electrical link (e.g., a metal wire or cable) 610 having a first end 611 and second end 612. Both the optical fiber 601 and the electric link 610 can be encased by a plastic covering 613. A first interface 604 is coupled to both the first end 602 of the optical fiber 601 and the first end 611 of the electrical link 610. A second interface 605 is coupled to both the second end 603 of the optical fiber 601 and the second end 612 of the electrical link 610.

As shown in FIG. 6, the first interface 604 of the digital optical/electrical cable 600 is coupled to a digital source device 640, and the second interface 605 of the digital optical/electrical cable 600 is coupled to a digital sink device 620.

In operation, the TMDS signals from the TMDS transmitter 642 of the source device 640 are serialized by the serializer 606, transmitted by the TOSA 607 and received across the optical/electrical cable 600 by the ROSA 608, deserialized by the deserializer 609, and transmitted to the TMDS receiver 622 of the digital sink device 620. The optical fiber 601 can provide data signal transmission from the digital source device 640 to the digital sink device 620 in a similar fashion to that described above with reference to FIG. 3.

Figure 2:
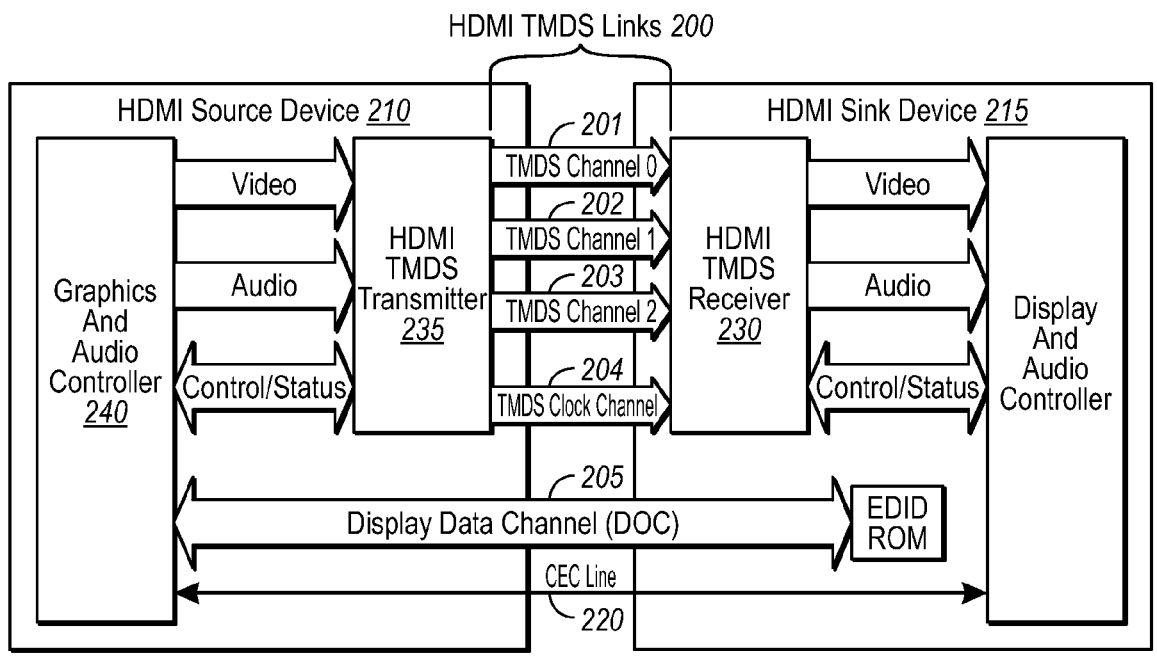
FIG. 2 illustrates the typical flow of data from the graphics and audio controller of a HDMI source to the display and audio controller of a HDMI sink.

Referring still to FIG. 6, the electrical link 610 electrically couples the sink controller 621 of the sink device 620 to the source controller 641 of the source device 640. The electrical link 610 can provide electrical communication for a return signal from the sink device 620 to the source device 640 in a direction opposite to that provided by the optical fiber 601. Bidirectional communication allows for both the source device 640 and the sink device 620 to send and receive data with each other. The electrical link 610 can also be used to provide unidirectional electrical communication or bidirectional electrical communication directions. For example, the electrical link 610 (or a plurality of electrical links) can provide electrical communication for transmission of the Display Data Channel and/or the CEC signals in a HDMI embodiment (e.g., see FIG. 2). The Display Data Channel and/or the CEC signals can also be transmitted along with the TMDS signals according to any of the embodiments described herein.

According to this example embodiment, the optical fiber 601 can be used to transfer the TMDS signals from the digital source device 640 to the digital sink device 620, in a direction where a larger bandwidth and larger transfer rate may be most advantageous. The electrical link 610 can be used to transfer a data signal in either direction in applications where the larger bandwidth and larger transfer rate may not be required. For example, the electrical link 610 may be used to send information that identifies the manufacturer and model number of the sink device 620 or the source device 640. This information may then be displayed on a screen by the digital source device 640 or the digital sink device 620. A relatively low bandwidth is needed to transmit information identifying the manufacturer and model number. Other low bandwidth signals can include various handshaking, configuration, updating of firmware or software, or control signals.

The electrical link 610 can comprise more than one electrical wires or cables for transferring data between the sink device 620 to the source device 640. For example, the electrical link 610 can be an unshielded twisted pair cable, ribbon cable, coaxial cable, etc.

According to other example embodiments, wavelength-division multiplexing and time-division multiplexing may be implemented for communication across any of the optical fibers discussed herein in a similar fashion to that described above with reference to FIG. 4 and FIG. 5.

The electrical link 610 may also transmit analog data signals between the sink device 620 and the source device 640. TDM may be used to transmit data over the electrical link 610 by interlacing packets of data in each direction with a header and fields or other means for identifying the source and/or purpose of the data in the packet payload.

Figure 7:
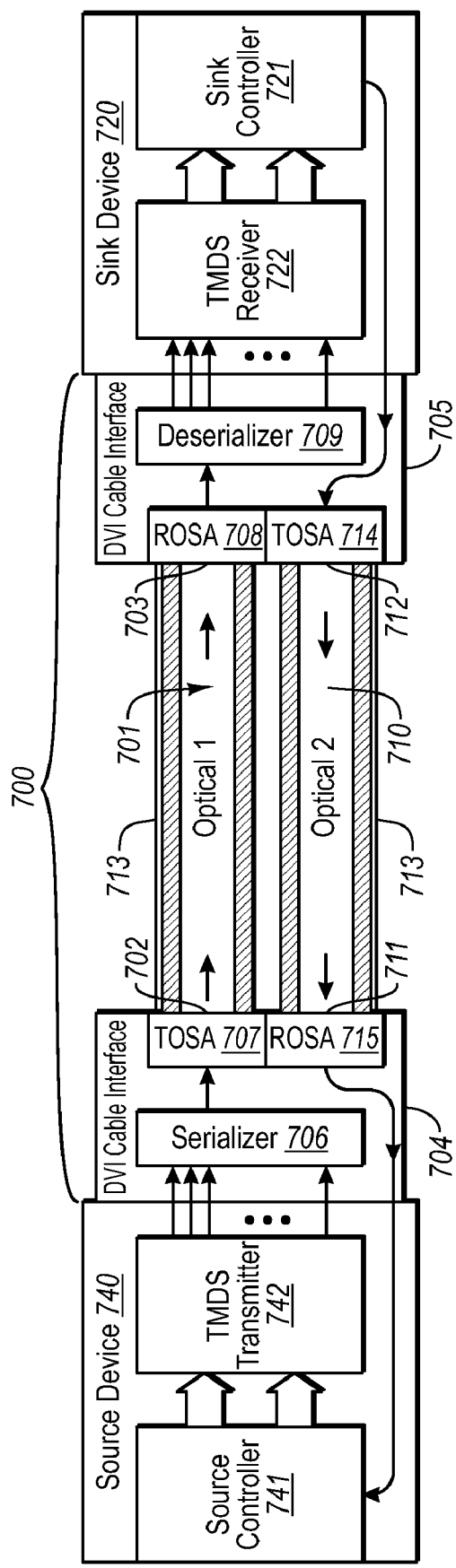
FIG. 7 illustrates a digital optical cable according to an example embodiment of the present invention.

Referring now to FIG. 7, a bidirectional digital optical cable 700 is shown according to an example embodiment of the present invention. The digital optical cable 700 comprises a first optical fiber 701 having a first end 702 and a second end 703, and a second optical fiber 710 having a first end 711 and a second end 712. Both the first optical fiber 701 and the second optical fiber 710 can be encased by a single plastic covering 713. A first interface 704 is coupled to both the first end 702 of the first optical fiber 701 and the first end 711 of the second optical fiber 710. A second interface 705 is coupled to both the second end 703 of the first optical fiber 701 and the second end 712 of the second optical fiber 710.

As shown in FIG. 7, the first interface 704 of the digital optical cable 700 is coupled to a digital source device 740, and the second interface 705 of the digital optical cable 700 is coupled to a digital sink device 720. The first optical fiber 701 is used for transmission of the TMDS signals from the source device 740 to the sink device 720. The first optical fiber 701 provides data signal transmission from the source device 740 to the sink device 720 in a similar fashion to that described above with reference to FIG. 3.

The second optical fiber 710 can be used for a return data transmission in the opposite direction from the sink device 720 to the source device 740. The second interface 705 includes a TOSA 714 that receives an electrical return signal from the sink controller 721 of the sink device 720. The TOSA 714 converts the electrical return signal into an optical return signal and transmits the optical return signal onto the second end 712 of the second optical fiber 710. The first interface 704 includes a ROSA 715 that receives the optical return signal from the first end 711 of the second optical fiber 710 and converts the optical return signal into an electrical return signal. The ROSA 715 transmits the electrical return signal to the source controller 741 of the source device 740.

According to this example embodiment, the first optical fiber 701 can be used to transfer the TMDS signals from the source device 740 to the sink device 720, and the second optical fiber 710 can be used to transfer data in the opposite direction. This embodiment may be particularly advantageous where a larger bandwidth and larger transfer rate is desirable in both directions. It should be appreciated that the direction of data transfer can be reversed or bidirectional in any of the embodiments described herein where advantageous.

According to an example embodiment, the TOSA 707 of the first interface 704 can include a VCSEL for transmission of the optical serialized data signal onto the first optical fiber 701; and the TOSA 714 of the second interface 705 can include a LED for transmission of the return optical signal onto the second optical fiber 710. An LED may be used for the TOSA 714 of the second interface 705 when lower bandwidths are acceptable. Using an LED may also be more cost effective than using a VCSEL. Thus, a VCSEL may be used for higher bandwidth paths, such as those sending video and/or audio data, while an LED may be used for lower bandwidth paths, such as those sending manufacturer, configuration, and model information and/or control signals.

According to other example embodiments, WDM and TDM can be implemented in either direction of the embodiment illustrated in FIG. 7 for communication across the optical fibers such as described above with reference to FIGS. 4 and 5.

Figure 8A:
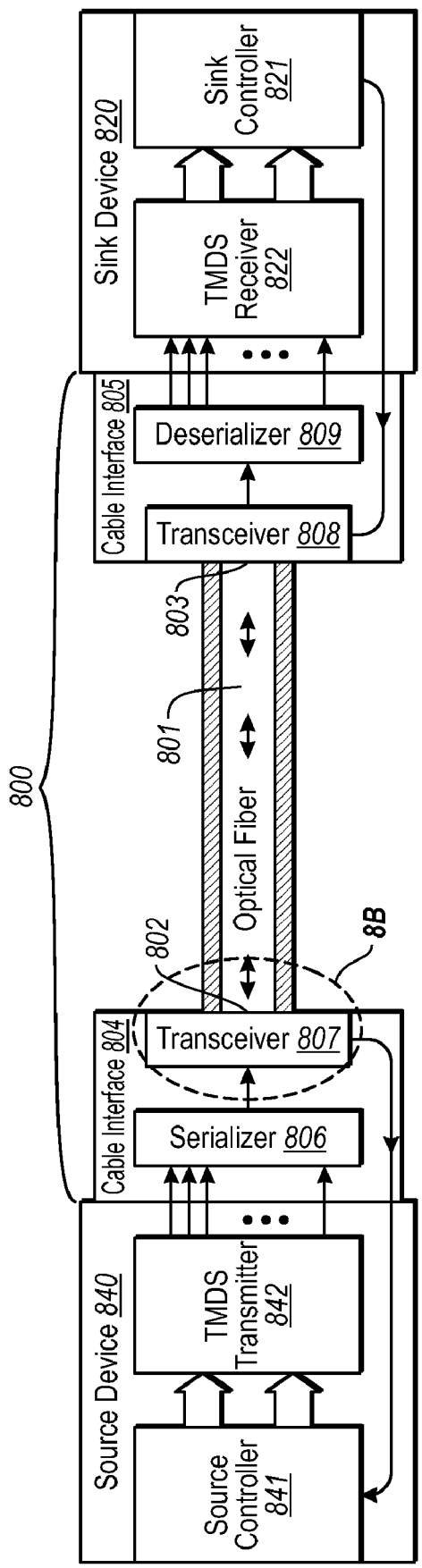
FIG. 8A illustrates a digital optical cable according to an example embodiment of the present invention.

Referring now to FIG. 8A, a bidirectional digital optical cable 800 is shown according to an example embodiment of the present invention. The digital optical cable can comprise a single optical fiber 801 having a first end 802 and a second end 803, the optical fiber 801. A first interface 804 is coupled to the first end 802 of the optical fiber 801 and a second interface 805 is coupled to the second end 803 of the optical fiber 801. As shown in FIG. 8A, the first interface 804 of the digital optical cable 800 is coupled to a digital source device 840 (e.g., a DVI or HDMI source device), and the second interface 805 of the digital optical cable 800 is coupled to a sink device 820 (e.g., a DVI or HDMI source device).

According the embodiment shown in FIG. 8A, the same optical fiber 801 is used for data transmission from the source device 840 to the sink device 820, and for the transmission of a return signal in the opposite direction from the sink device 820 to the source device 840.

Figure 8B:
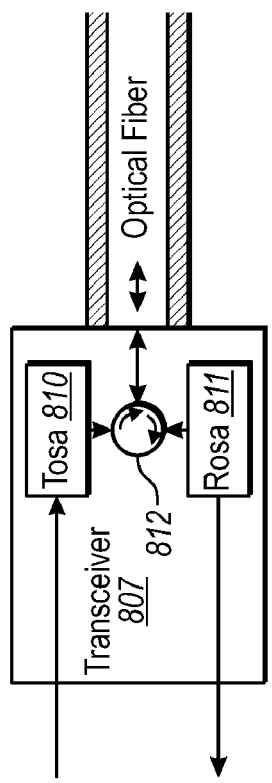
FIG. 8B illustrates a bidirectional optical device for use in a digital optical cable according to an example embodiment of the present invention.

Each interface 804 and 805 can include a fiber optic transceiver 807 for bidirectional optical communication. A transceiver can be both a means for converting an electrical signal to an optical signal, and also a means for converting an optical signal to an electrical signal. Several different transceiver embodiments can be implemented. FIG. 8B depicts an example embodiment of a transceiver 807. The transceiver 807 can include a TOSA 810 for sending optical signals, and a ROSA 811 for receiving optical signals. The TOSA 810 can include an optical transmitter (e.g., a laser or LED) that receives an electrical data signal, converts the electrical data signal into an optical data signal, and transmits the optical data signal onto the optical fiber 801. The ROSA 811 includes an optical receiver that receives an optical data signal from the optical fiber 801 and converts the signal to an electrical data signal. The transceiver 807 can further include an optical circulator 812 that separates transmitted and received data signals. While a particular embodiment of a transceiver 807 is shown and described, other embodiments including other optical subassemblies and components can be used to send and receive optical signals over the digital optical cable, for example as discussed below with reference to FIGS. 9-14B.

According to an example embodiment, the TOSA 810 of the first interface 804 can include a VCSEL for transmission of the optical serialized data signal onto the optical fiber 801; and the TOSA 810 of the second interface 805 can include a LED for transmission of the return optical signal onto the optical fiber 801 in the opposite direction.

The optical cable 800 couples the sink controller 821 of the sink device 820 to the source controller 841 of the source device 840 for bidirectional transmission of data. The optical fiber 801 can be used to transfer the TMDS signals from the digital source device 840 to the digital sink device 820. The same optical fiber 801 can also be used to transfer return data in the opposite direction. In an HDMI embodiment, the same optical fiber 801 can be used to transfer the DDC and CEC signals. This embodiment may be particularly advantageous where a single optical fiber is desirable.

According to other example embodiments, WDM and TDM may be implemented in either direction for communication across the optical fiber 801. However, in some instances the highest speed communication may only be necessary in one direction (i.e., from the source device 840 to the sink device 820), but not necessarily in the opposite return direction. In this case, TDM across the single optical fiber 801 may not be as advantageous because of asymmetric rates of data transfer, whereas WDM may be more advantageous.

Power for the fiber optic components can be supplied by the 5 VDC power source connection located on standard cables (e.g., DVI and HDMI cables). Power for the fiber optic components may also be supplied externally, or internally, to the fiber optic components from other exterior power sources or internal power sources.

Using an optical fiber to transmit the TMDS signals and/or other signals between a digital sink device and a digital source device can reduce the EMI fields, which is one factor that may limit the length of conventional cables using copper cables to transmit the TMDS signals. This may in some cases eliminate the need for repeaters. Fiber optic data transmission is accurate and efficient over relatively long distances that may be many times longer than that typically achieved using metal based cables to transmit TMDS signals. Fiber optic data transmission over longer distances may also be less susceptible to interference than transmission using metal based cables. Fiber optic cables may also be thinner and lighter than metal cables. Fiber optic cables may also eliminate the need for digital to analog and analog to digital conversion. Therefore, the present invention may allow for increased length of digital, video, and/or audio cables, remote placement of digital video and/or audio components, reduced hardware, and less transmission errors over those available using conventional cables with copper links.

In addition, fiber optic technology is characterized by high bandwidth and reliable, high-speed data transmission. While a typical copper based cable bandwidth may range from 22.5 Mpps to 165 Mpps, reliable fiber optic communication over a single optical fiber may be able to achieve speeds faster than the speed of a copper based digital transmission cable. As a result, digital optical cables configured in accordance with the present invention may facilitate increased bandwidth and data transfer rates over copper based digital cables. The increased bandwidth and data transfer rates in turn may facilitate the use of higher resolution or larger displays having more display pixels.

Embodiments of the present invention can comprise a TOSA including an optical package (e.g., a TO-Can package) having an optical transmitter (e.g., a VCSEL), a monitor photodiode, and a laser driver within the optical package for transmitting the optical signal to the optical fiber. Any of the optical transmitter, monitor photodiode, and laser driver may be discrete components, or may be made from a common epitaxial design. Some aspects of embodiments of the optical package are further described in U.S. patent application Ser. No. 11/082,521 entitled "Laser Package With Digital Electronic Interface" filed Mar. 17, 2005, the contents of which are hereby incorporated by reference herein. According to an embodiment, the laser driver can be a modulation laser driver for providing a modulation current source to the laser. A bias current source may be supplied to the laser from a source external to the TOSA, such as the 5 VDC power source connection located on a standard cable. The optical package can be incorporated as part of the first interface and/or the second interface where a TOSA is referenced in the embodiments described above.

Where cables of the networks discussed herein are closed-loop in that the optical components are contained within the cables or networks, simplified laser drivers can be included for driving the optical components as discussed in U.S. Provisional Patent Application No. 60/717,352 entitled (Laser Driver for Closed Path Optical Cables" filed on Sep. 15, 2005, the contents of which are incorporated by reference herein.

2. Illustrative Bidirectional Optical Devices for Use in Optical Cables and Optical Networks Embodiments implementing bidirectional optical communication can comprise various transceiver designs. Referring again to FIG. 8A, the transceiver 807 can comprise various different subcomponents, assemblies, and configurations for sending and receiving optical signals across the single optical fiber. For example, referring to FIG. 9 a bidirectional optical assembly 910 is illustrated according to an example embodiment of the present invention. The bidirectional optical assembly 910 can be used in the digital optical cable of FIG. 8A in place of the transceiver embodiment shown in FIG. 8B for bidirectional optical communication across the optical fiber 801.

Figure 9:
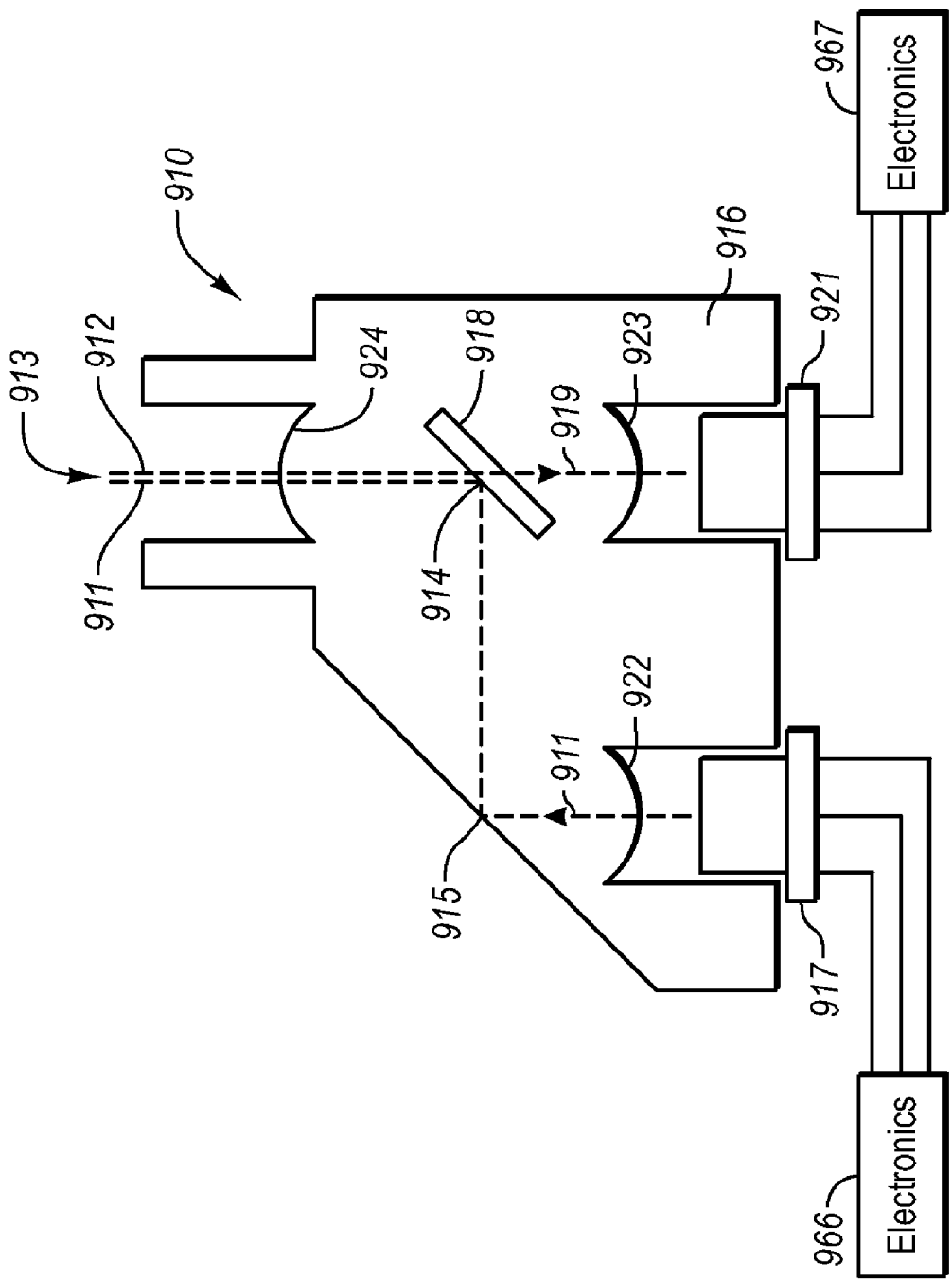
FIG. 9 illustrates a bidirectional optical device for use in a digital optical cable according to an example embodiment of the present invention.

FIG. 9 is a basic diagram of a bidirectional multiband optical assembly 910. Light 911 of a first wavelength may be emitted by light source 917, which may be reflected at points 915 and 914 and exit optical port 913. Light source 917 may be a VCSEL outputting light 911 that may be modulated in one form or another with communication signals or the like. These functions may be accomplished with an electronics module 966 that is connected to source 917. Source 917 may be another kind of device as appropriate for an application of the assembly. Light 911 may have other wavelengths, besides the first wavelength, which may be filtered out by a filter or mirror. Points 915 and 914 are where light is reflected and may be located at mirrors that are discrete or integrated parts of structure 916, such as an internal reflecting surface in the structure, or a reflective filter. Point 914 may be where filter 918 is reflective of a particular wavelength. Filter 918 may allow light 919 to pass through it to optical port 923. Light 912 may enter optical port 913 and go through a wavelength filter 918. Filter 918 may be a dichroic filter that reflects one or more wavelengths and transmits others. Filter 918 may be designed to pass light 919 of a second wavelength. All other wavelengths of light 912 are not transmitted through filter 918. Light 919 of the second wavelength may be detected by a detector 921 and converted into electrical signals. Light 919 may be modulated. Detector 921 along with an electronics module 967 may demodulate such light. Detector 921 may be a photo detector or another kind of device as appropriate for an application of the assembly. Light signals may be sent and received by device 910 simultaneously. On the other hand, components 917 and 921 may both be detectors or sources and receive or send, respectively, various signals simultaneously on different wavelengths of light, or on the same wavelength.

Source 917 and detector 921 may be enclosed within a standard TO-can (e.g., TO-5 or TO-18) as optical components. These components may electronically and packaging-wise have interfaces to standard PCBs for small for factor pluggable (SFP) modules. These components may have other forms of packaging. Alternatively, source 917 and detector 921 may be integral parts of structure 916. Lenses 922 and 923 for light source 917 and detector 921, respectively, may be molded plastic parts. The lenses also may be parts integrated into structure 916 or be molded as part of the structure. Lenses 922 and 923 may instead be part of TO-can components 917 and 921, or be situated on or monolithically be a part of the laser and detector chips. Lens 924 at optical port 913 may focus incoming light to a mirror, filter or detector in structure 916. It may also focus outgoing light to a light waveguide, such as a fiber, at optical port 913. Lens 924 may have the same structural characteristics as those of lenses 922 and 923. Lenses 922, 923 and 924 may also be used to collimate light.

Structure 916 may be a molded plastic part, made from a material such as Ultem®, or it may be an injection molded metal part or other metal housing. Structure 916 also may be made from a composite material. The TO-can optical components 917 and 921 may be attached to the plastic or metal structure 916 with an epoxy or laser welding. These components are alignment tolerant. Metal rings may be attached to a plastic structure 916 for laser welding metal components to it. Dichroic filter 918 or mirror may be placed in a molded indent formed within plastic or metal structure 916 and glued in place or it may be inserted and held in place by compression. A molded groove in structure 916 may provide appropriate alignment of dichroic filter 918. Alternatively, structure 916 may be composed of two pieces glued together, one or both of which may have dichroic reflectors deposited on their surfaces.

Figure 10:
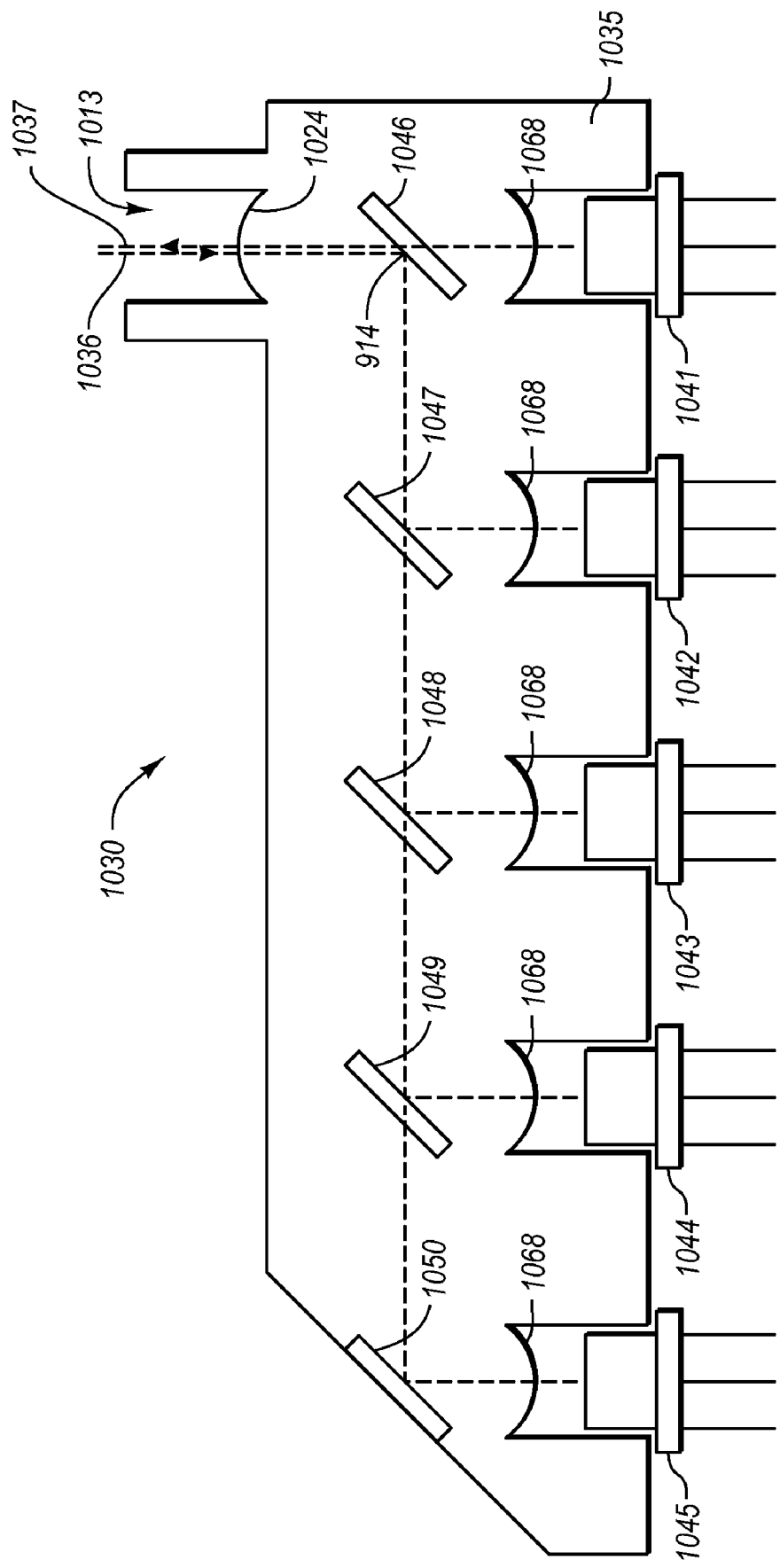
FIG. 10 illustrates a bidirectional optical device for use in a digital optical cable according to an example embodiment of the present invention.

FIG. 10 shows a bidirectional optical device 1030 having a multitude of optical components, such as detectors or sources, or a mix of detectors and sources. The number of optical components is arbitrary, and may be determined by the application of device 1030 or the standard of a digital optical cable (e.g., the number of communication links in a DVI or HDMI standard). Device 1030 reveals five optical components 1041, 1042, 1043, 1044 and 1045, as an illustrative example of a structure 1035. Light 1036 may arrive through port 1013 and light 1037 may exit port 1013. Light 1036 received may have a multitude of wavelengths (e.g., each representing a TMDS signal), each wavelength having communication signals different from those of other wavelengths. Similarly, light 1037 sent out may have a multitude of wavelengths (e.g., representing TMDS, or other signals), each wavelength having communication signals different from those of other wavelengths. Light 1036 and light 1037 may be conveyed to and from optical components 1041, 1042, 1043, 1044 and 1045 by an optical mechanism 1038. Mechanism 1038 may be a light waveguide, an optical fiber, a series of mirrors, or other items to accomplish the conveyance of light 1036 and 1037 to and from the optical components. Or, mechanism 1038 might not be utilized. Lenses 1024 and 1068 may be used to focus or collimate light as appropriate. The lenses may be an integral part of structure 1035. Light 1036 and light 1037 to or from optical components 1041, 1042, 1043, 1044 and 1045 may go through filters, for example, filters 1046, 1047, 1048, 1049 and 1050, respectively. In other words, if each optical component has a wavelength different from the other optical components, there may be a filter of that wavelength associated with the respective component. For instance, optical component 1041 may send or receive light signals if a first wavelength or bandwidth (e.g., a first TMDS signal); optical component 1042 may send or receive light signals of a second wavelength or bandwidth (e.g., a second TMDS signal); optical component 1043 may send or receive light signals of a third wavelength or bandwidth (e.g., a third TMDS signal); optical component 1044 may send or receive light signals of a fourth wavelength or bandwidth (e.g., a fourth TMDS signal); and optical component 1045 may send or receive light signals of a fifth wavelength or bandwidth (e.g., a fifth TMDS signal). Similarly, filter 1046 may transmit or pass light signals only of a first wavelength or bandwidth; filter 1047 may transmit light only of a second wavelength or bandwidth; filter 1048 may transmit light of only a third wavelength or bandwidth; filter 1049 may transmit light of only a fourth wavelength or bandwidth; and filter 1050 may transmit light of only a fifth wavelength or bandwidth. All of optical components 1041, 1042, 1043, 1044 and 1045 may send light signals 1037 and/or receive light signals 1036 at the same time.

Filters 1046, 1047, 1048, 1049 and 1050 may be replaced with, for example, dichroic reflectors or other wavelength or bandwidth discriminating mechanisms. With such replacements, the optics may be adjusted for conveying light signals 1036 and 1037 to and from optical components 1041, 1042, 1043, 1044 and 1045. Structure 1035 may be made from molded plastic, for example, Ultem®, metal, composite materials or other suitable materials.

Figure 11:
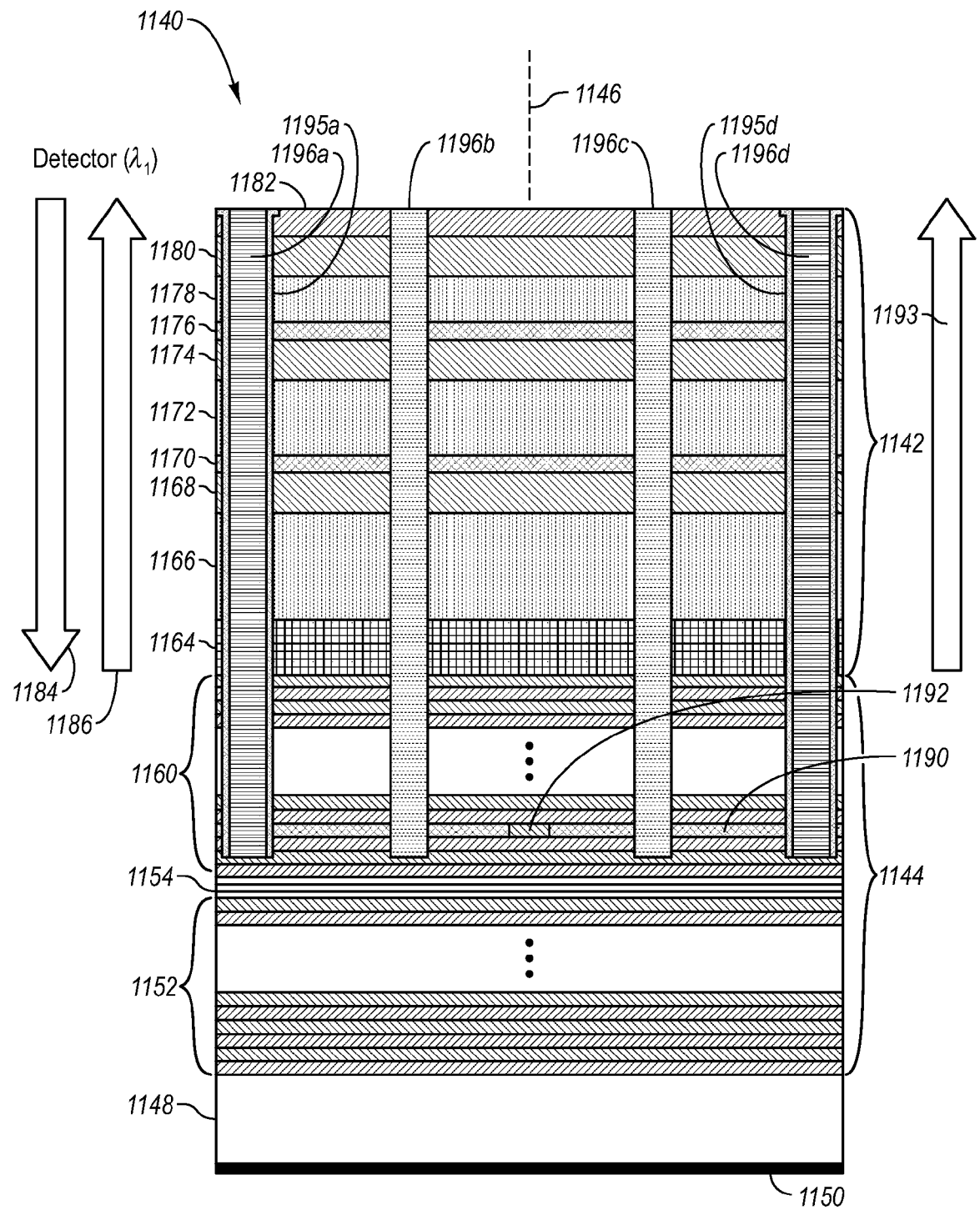
FIG. 11 illustrates a bidirectional optical device for use in a digital optical cable according to an example embodiment of the present invention.

FIG. 11 is a cross-sectional side view of an illustrative optical transceiver in accordance with the present invention. The illustrative optical transceiver is generally shown at 1140, and includes an optical detector 1142 situated above an optical transmitter 1144, both aligned along a common optical axis 1146. The optical detector 1142 preferably absorbs a first wavelength and/or range of wavelengths, while passing a second wavelength and/or range of wavelengths. The optical transmitter 1144 preferably transmits a second wavelength and/or range of wavelengths, which passes through the optical detector 1142 and out the top of the optical transceiver 1140. In the illustrative embodiment, both the incoming light beam and the outgoing light beam pass through the top side of the optical transceiver 1140.

Although any suitable optical transmitter 1144, fabricated from any of a number of semiconductor materials may be used, the optical transmitter 1144 shown in FIG. 11 is a planar, current-guided GaAs/AlGaAs top emitting Vertical Cavity Surface Emitting Laser (VSCEL). The illustrative VCSEL 1144 is formed on an n-doped gallium arsenide (GaAs) substrate 1148, which has an n-contact layer 1150 provided on the bottom surface. An n-type mirror stack 1152 is formed on the substrate 1148. The n-type mirror stack 1152 is preferably a distributed Bragg reflector (DBR), which includes periodic layers of doped AlGaAs with alternating higher and lower aluminum fractions. An active region 1154 is shown atop the n-type mirror stack 1152. The active region 1154 preferably has a number of quantum wells, but may be any suitable active region as desired. Also, the active region 1154 may include a bottom confinement layer and a top confinement layer. A p-type mirror stack 1160 is provided on top of the active region 1154 to complete the VCSEL structure. The p-type mirror stack 1160 is preferably a distributed Bragg reflector (DBR), which includes periodic layers of doped AlGaAs with alternating higher and lower aluminum fractions. The n-type mirror stack 1152, active region 1154 and p-type mirror stack 1160 are preferably configured to produce an outgoing light beam that has the second wavelength and/or range of wavelengths.

An optical detector 1142 is provided atop the VCSEL 1144. The illustrative optical detector 1142 includes three series connected photodiodes, which are also connected in series with the VCSEL 1144. A heavily p-doped buffer layer 1164 may be provided on top of the top mirror 1160, as shown.

To form the first photodiode, a p-doped layer 1166 is provided on the heavily p-doped buffer layer 1164, followed by an n-doped layer 1168. Both the p-doped layer 1166 and the n-doped layer 1168 may be AlGaAs. The Al fraction is preferably adjusted to tune the bandgap of the layers to achieve a desired absorption cutoff wavelength, which in the illustrative embodiment, is below the emission wavelength of the VCSEL 1144.

A reverse biased tunnel junction 1170 is coupled to the first photodiode. The tunnel junction 1170 includes two highly but oppositely doped adjacent layers to create an abrupt junction that produces a narrow depletion, allowing substantial tunneling current even at relatively low reverse bias voltages. In the illustrative embodiment, the bottom layer of the tunnel junction 1170 is n-type and the top layer is p-type. The n-type bottom layer makes good electrical contact with the n-doped layer 1168 of the first photodiode, and the p-type top layer makes good electrical contact with a p-doped layer 1172 of the second photodiode, which includes P-doped layer 1172 and n-doped layer 1174.

Once the tunnel junction 1170 is formed, the p-doped layer 1172 is provided, followed by an n-doped layer 1174 to form the second photodiode. The tunnel junction 1170 makes the series connection between the first photodiode and the second photodiode. Like the first photodiode, both the p-doped layer 1172 and the n-doped layer 1174 may be AlGaAs. The Al fraction is preferably adjusted to tune the bandgap of the layers to achieve the same cutoff wavelength as the first photodiode, but this is not required in all embodiments. Yet another tunnel junction 1176 is then formed, followed by a p-doped layer 1178 and an n-doped layer 1180 to form a third photodiode.

During use, an incoming light beam 1184 having a first wavelength and/or range of wavelengths is provided to the top of the optical transceiver 1140. Each of the first, second, and third photodiodes is preferably tuned to absorb at least a portion of the first wavelength and/or range of wavelengths of the incoming light beam 1184. The p-type mirror stack 1160 of the VCSEL is preferably at least partially reflective at the first wavelength and/or range of wavelengths. Thus, at least part of the light that is not absorbed by the first, second, and third photodiodes will be reflected back through the photodiodes, as shown at 1186. The thickness of the first, second, and third photodiodes is preferably adjusted so that each photodiode absorbs approximately the same energy from the incoming light beams 1184 and 1186. In one embodiment, the thickness of the first, second, and third photodiodes is about 0.30, 0.27, and 0.23 microns, respectively, for an absorption wavelength of 808 microns. An upper contact layer 1182 may be provided to make electrical contact to the n-type layer 1180 of the third photodiode. One or more quarter wave oxide or nitride layers (not shown) may also be provided on top of the structure 1140 to reduce reflection and to help protect the optical transceiver 1140.

In one illustrative embodiment, and to help define the current aperture of the VCSEL 1144, one or more trenches 1196a-1196d may be etched through the first, second, and third photodiodes, and in some embodiments, into the top p-type mirror stack 1160 of the VCSEL 1144. This may be accomplished with a Reactive Ion Etch (RIE), but any suitable patterning method may be used. To facilitate selective lateral oxidization, one or more of the periodic layers of the top p-type DBR mirror stack 1160 of the VCSEL 1144 is provided with a higher Al concentration relative to the other periodic layers. When exposed to an oxidizing environment through the one or more trenches 1196a-1196d, layer 1190 is selectively oxidized in a lateral direction to form a current aperture 1192 for the VCSEL 1144. The extent of the lateral oxidization can be controlled by controlling the exposure time of layer 1190 to the oxidizing environment. As can be seen, the exposure time is preferably controlled so that a desired current aperture 1192 remains. In one embodiment, the current aperture 1192 of the VCSEL 1144 has a diameter of about 5-10 microns.

In the illustrative embodiment, the lateral dimension of the first, second, and third photodiodes is greater than the lateral dimensions of the aperture 1192 of the VCSEL 1144. In the illustrative embodiment, the lateral dimension of the first, second, and third photodiodes may be on the order of 100-200 microns, while the lateral dimension of the optical cavity of the VCSEL 1144 may be on the order of 5-10 microns. When an optical fiber having a diameter of, for example, 100 microns is positioned above the optical transceiver 1140, the lateral dimension of the first, second, and third photodiodes may be sufficiently wide to absorb much of the incoming light beam without the need for a lens or other light concentrating element. Further, the alignment of the optical fiber to the first, second, and third photodiodes may not be difficult or critical. Likewise, and because the aperture 1192 of the VCSEL 1144 is relatively small relative to the diameter of the optical fiber, much of an outgoing light beam 1193 produced by the VCSEL 1144 will be captured by the optical fiber without the need for a lens or other light concentrating element. As such, an efficient and cost effective optical transceiver 1140 may be provided.

In some embodiments, the depth of the trenches 1196a-1196d may only be about 1-2 microns wide. A metal layer may then be deposited on top of the structure 1140 to fill in at least some of the trenches, such as trenches 1196a and 1196d, to make an electrical connection to the top mirror 1160 of the VCSEL 1144. To prevent the metal layer from making electrical contact with the various intermediate layers of the optical detector 1142, those trenches that are filled with the metal layer may first be lined with a dielectric layer as shown at 1195a and 1195d. As further described below, these electrical connections may be useful when it is desirable to provide the entire electrical potential produced by the series connected first, second, and third photodiodes to other devices or structures.

Figure 12:
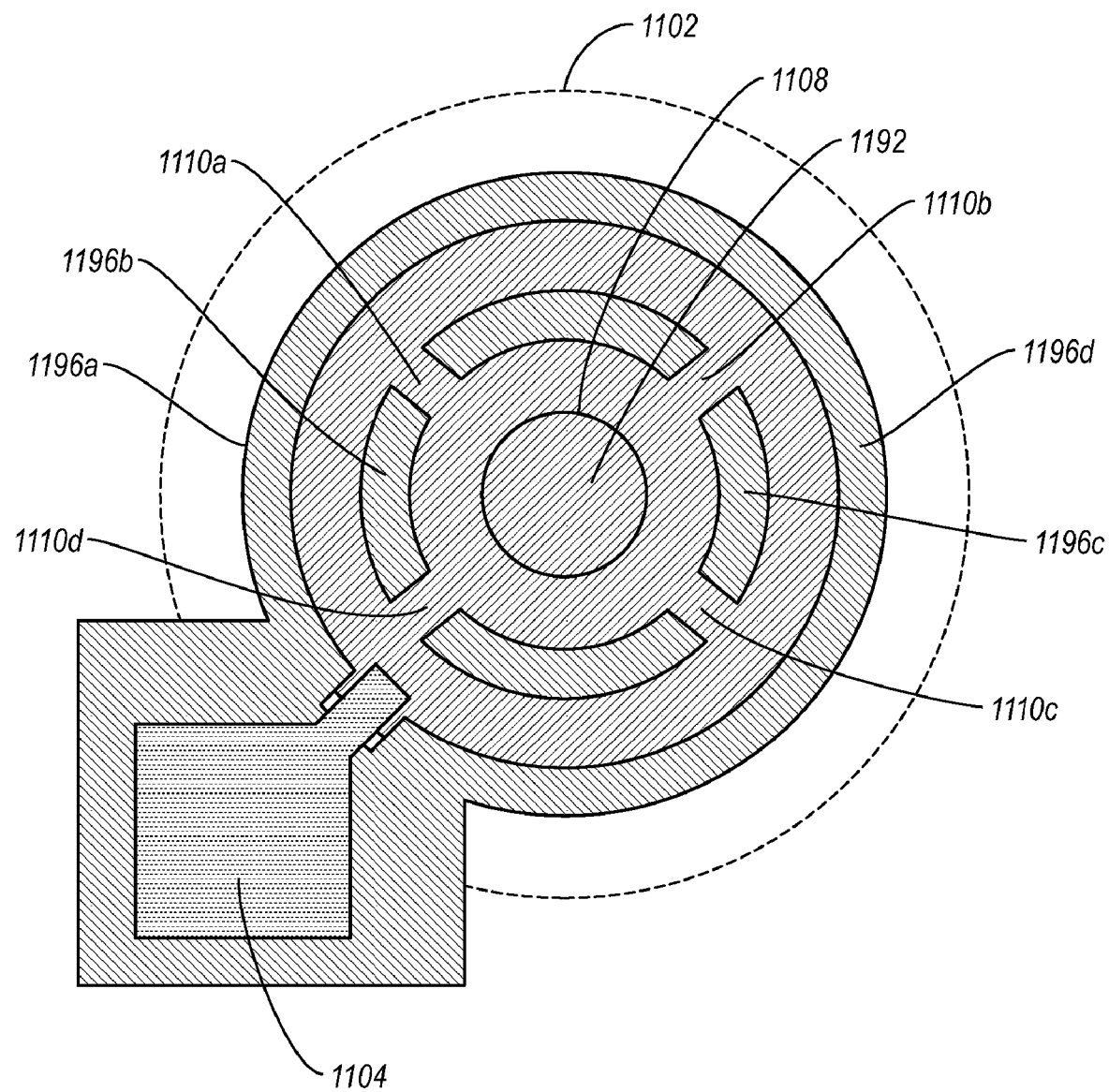
FIG. 12 illustrates a bidirectional optical device for use in a digital optical cable according to an example embodiment of the present invention.

FIG. 12 is a top view of the illustrative optical transceiver of FIG. 11. FIG. 12 shows the top of the optical detector 1142 including trenches 1196a-1196d, as well as the lateral extent of the lateral oxidization of layer 1190 of VCSEL 1144. Also shown is a metal contact 1104 used to make electrical contact to the top of the optical detector 1142.

The outer boundary of the illustrative optical detector 1142 is defined by the outer trench, which is collectively shown at 1196a and 1196d. The outer trench helps to electrically isolate the optical detector 1142 from other optical detectors or devices formed on the same substrate. The outer trench also helps keep the total capacitance of the optical detector 1142 down. The illustrative outer trench 1196a and 1196d is circular in shape, but other shapes may be used. The inner trench, collectively 1196b 1196c, is also circular in shape, and is spaced inward from the outer trench. The inner trench may be filled with an oxide or other dielectric, if desired.

In the illustrative embodiment of FIG. 12, the inner trench, 1196b and 1196c, includes one or more bridges, such as bridges 1110a-1110d. Bridges 1110a-1110d provide an electrical connection between the portion of the optical detector 1142 that is situated inside of the inner trench, 1196b and 1196c, and the portion of the optical detector 1140 that is situated between the inner trench, 1196b and 1196c, and the outer trench, 1196a and 1196d. When so provided, the metal contact 1104 may only extend over and make an electrical connection to the portion of the optical detector 1142 situated between the inner trench, 1196b and 1196c, and the outer trench, 1196a and 1196d. If the bridges 1110a-1110d are not provided, a metal trace may be provided across the inner trench 1196b and 1196c to make an electrical connection to the portion of the optical detector 1142 situated inside of the inner trench 1196b and 1196c, if desired. As can be seen, the optical detector 1142 may cover a relatively larger area than the aperture 1192 of the VCSEL 1144. When the outer trench, 1196a and 1196d, and inner trench, 1196b and 1196c, are exposed to an oxidizing environment, layer 1190 of VCSEL 1144 (see FIG. 11) is selectively oxidized in a lateral direction to form a current or optical aperture 1192. The extent of the lateral oxidization is shown by dashed line 1102 and solid line 1108. In the embodiment shown, layer 1190 of VCSEL 1144 is oxidized outward from the outer trench to dashed line 1102 and inward from the outer trench toward the inner trench. Likewise, layer 1190 of VCSEL 1144 is oxidized outward from the inner trench toward the outer trench, and inward from the inner trench to dashed line 1108. Dashed line 1108 outlines the current aperture 1192 of the VCSEL 1144. In one embodiment, the current aperture 1192 has a diameter of about 5-10 microns, which produces a lower power VCSEL transmitter.

In some embodiments, the inner and outer trenches may be filled with an oxide or other isolation material. In other embodiments, a metal layer (not shown in FIG. 12) may be deposited down into at least part of the some of the trenches, such as the inner and/or outer trenches 1196a-1196d, to make an electrical connection to the top mirror 1160 of the VCSEL 1144. When a metal layer is provided, a dielectric layer may first be provided to help prevent the metal layer from making electrical contact with the various intermediate layers of the optical detector 1142. As further described below, this electrical connection may be useful when it is desirable to make the entire electrical potential produced by the series of connected first, second, and third photodiodes available to other devices or structures. In a similar manner, and in some embodiments, appropriate trenches and metal contacts can be provided such that all three electrical contacts are separately available on the top surface, enabling, for example, flip-chip bonding to either opaque or transparent substrates.

Any of the embodiments of the present invention illustrated herein can include monolithically formed laser diodes and photodiodes. In one such embodiment, the laser diodes and photodiodes are connected through tunnel junctions such that a single power supply may be used to power the laser diodes and photodiodes. Appropriate contacts are formed to allow access to the various junctions of the laser diodes, tunnel junctions, and photodiodes.

Referring now to FIG. 13, an example of an optoelectronic device including an epitaxial structure 1300 that includes layers formed on a wafer substrate is shown. In one embodiment, the structure 1300 is grown using a GaAs wafer. However, other III-V (three-five) semiconductor combinations may also be used. FIG. 13 shows a VCSEL 1301. The VCSEL 1301 in the example shown includes a top mirror 1302, an active region 1304, and a bottom mirror 1306. A p-n junction exists in the active region 1304.

A spacer layer 1311 is formed below the bottom mirror 1306. The spacer layer 1311 is preferably about $5\lambda/4$ or $7\lambda/4$ where $\lambda$ is the wavelength of light that the VCSEL 1301 is designed to emit. The spacer layer 1311 may be any odd integral multiple of the wavelength (i.e., $$\frac{\lambda(1+n)}{4}$$

where n is an integer) that is thick enough to account for non-uniformities that may occur in various layers of the epitaxial structure 1300. The spacer layer 1311 must be sufficiently thick such that when etching is done to the spacer layer 1311 the deepest non-uniformities do not go all the way through the spacer layer 1311 and the shallowest potions reach the spacer layer 1311. The goal, therefore, is to expose the spacer layer 1311 without going all the way through the spacer layer 1311 at any point. Subsequent processing uses a selective etchant such as dilute hydrofluoric acid to uniformly expose the layer underlying the spacer.

The epitaxial structure 1300 further includes a tunnel junction 1308, formed on and electrically connected to the VCSEL 1301. The tunnel junction 1308 includes a heavily doped n+ layer 1310 and a heavily doped p+ layer 1312.

The epitaxial structure 1300 further includes a photodiode, formed on and electrically connected to the tunnel junction 1308, which includes a second p-n junction that is comprised of the heavily doped p+ layer 1312 of the tunnel junction 1308 and a lightly doped photodiode n-type layer 1314. An additional p-type layer (not shown) that is not as heavily doped may also be fabricated between the p+ layer 1312 and the photodiode n-type layer 1314. In one embodiment, the epitaxial structure 1300 is constructed on an n-type substrate 1316. Although the substrate 1316 is shown in FIG. 13 as a thin layer, the substrate is actually in one embodiment of the invention in the hundreds of microns whereas the epitaxial structure 1300 including the photodiode 1318, the tunnel junction 1308, and the laser diode 1301 is about 10 microns. The epitaxial structure 1300 is generally grown using a metal organic chemical vapor phase deposition (MOCVD) process.

The top mirror 1302 is a distributed Bragg reflector (DBR) that generally comprises a number of alternating layers with high and low indexes of refraction. This creates a mirror with high reflectivity, around 99.5%. In the example shown, the top mirror is constructed of p-type materials such as carbon doped aluminum gallium arsenide (AlGaAs), where the fraction of Al can vary from 0% to 100%. The top mirror 1302 includes about 20 mirror periods where each period includes a high index of refraction layer and a low index of refraction layer.

The active region 1304 includes a number of quantum wells for stimulating the emission of laser energy. In the embodiment shown, active region 1304 is less than 1 micron.

Below the active region is a bottom mirror 1306. The bottom mirror is comprised of about 30 to 35 doped n-type mirror periods. Silicon is one example of a dopant that may be used in the bottom mirrors.

The tunnel junction 1308, as mentioned previously, includes a heavily doped n+ layer 1310 and a heavily doped p+ layer 1312. To accomplish the heavy doping, it may be desirable to create a super lattice structure. For example, instead of only GaAs layers, it may be desirable to include both layers of GaAs and InGaAs (e.g., several alternating layers) to tailor the bandgap and doping properties to improve the tunnel junction 1308. It is also desirable that the tunnel junction 1308 be somewhat transparent so as to allow optical energy to pass through to the photodiode layer 1314. This may be done in one embodiment by increasing doping on the heavily doped n+ layer 1310 so as to increase transparency through the so-called Burstein shift.

It would advantageous to balance the thickness of the heavily doped p+ layer 1312 such that appropriate conduction exists through the tunnel junction 1308 while maintaining appropriate transparency. Thus, in one embodiment of the invention, the heavily doped p+ layer 1312 is about 50 to 100 nanometers and preferably at least $3\times10^{19}$ of p-type material (e.g., when used in an 850 nm laser). The heavily doped n+ layer 1310 may be nearly any practicable thickness without imposing an optical penalty.

Below the tunnel junction 1308 is a photodiode 1318. The photodiode 1318 should be constructed so as to have an appropriate responsivity to incoming light. Thus, in one embodiment of the invention, the photodiode 1318 includes a lightly doped n-type layer 1314 that is approximately three microns or less when the VCSEL 1301 is designed to emit an 850 nm wavelength. One embodiment of the invention includes a lightly doped n-type layer 1314 that is about 1.5 microns. Notably, the thickness of the lightly doped n-type layer 1314 can be used to tailor the responsivity and speed of the photodiode.

Figure 14A:
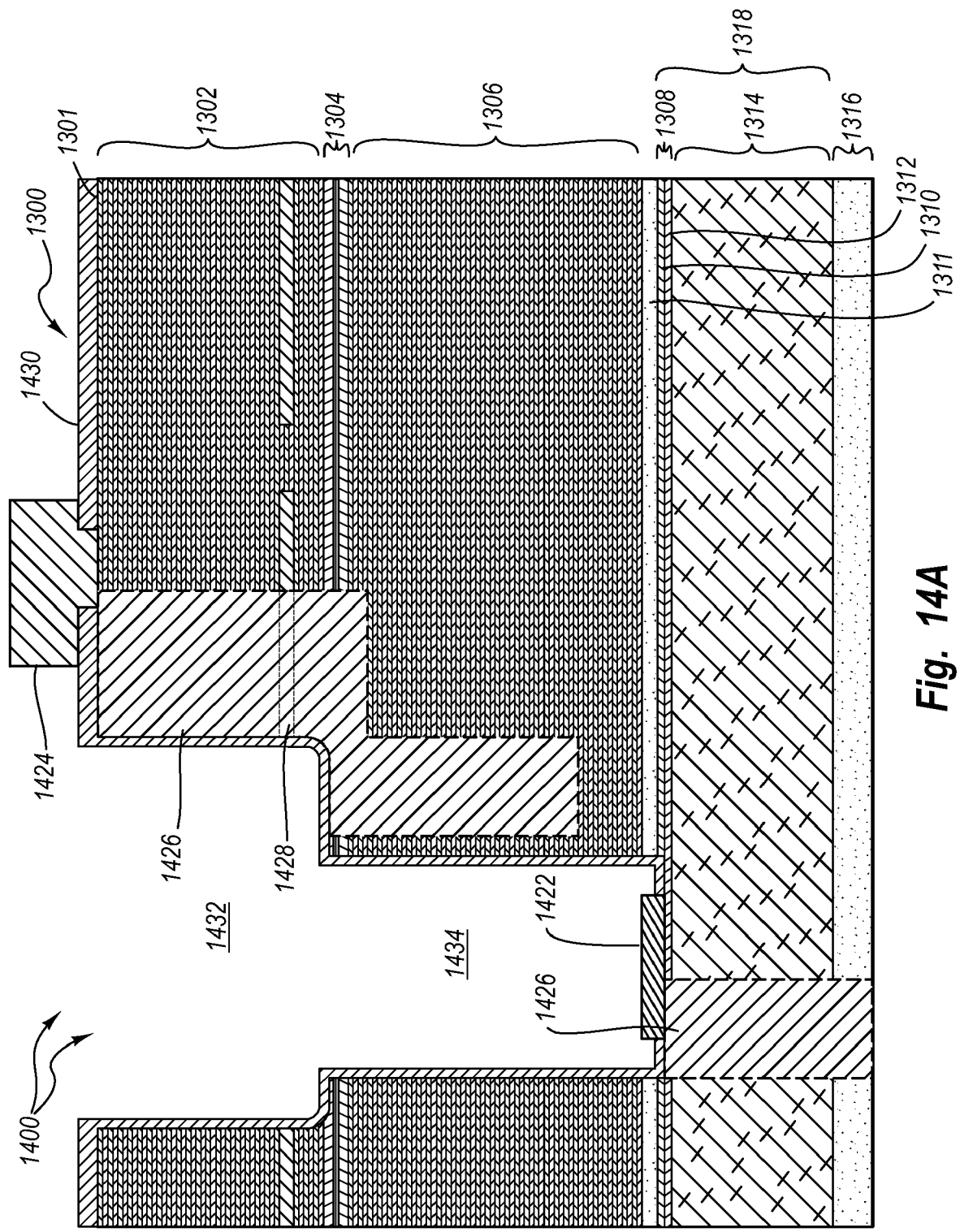
FIGS. 14A and 14B illustrate a bidirectional optical device with an integrated monitor photodiode for use in a digital optical cable according to an example embodiment of the present invention.

Referring now FIG. 14A, an embodiment is shown where contacts and oxide layers are formed through a photolithographic process. The formation of contacts allows appropriate biasing to be applied to and signals to be read from the VCSEL 1301 and photodiode 1318. The lithographic process includes a series of acts where photoresist is applied to the epitaxial structure 1300. The photoresist is then exposed lithographically to various patterns. Lithographic exposure allows a pattern of photoresist to remain on the epitaxial structure 1300 while the remainder of the photoresist may be washed from the epitaxial structure 1300.

The patterns of photoresist that remain on the epitaxial structure 1300 block ions from being implanted in the epitaxial structure 1300, metal from being deposited on the epitaxial structure 1300, and etching solutions from etching portions of the epitaxial structure 1300. Thus, using appropriate photolithographic processes a monolithic structure 1400 that includes a VCSEL 1301, a tunnel junction 1308 and a photodiode 1318 may be constructed with appropriate contacts and with appropriate isolation from other devices on a wafer being fabricated simultaneously.

In the example shown in FIG. 14A, a tunnel junction contact 1422 is formed such that it connects to the heavily doped p+ layer 1312. A VCSEL contact 1424 is formed such that it connects to the top mirror 1302 of the VCSEL 1301. Another contact may be formed on the bottom of the substrate 1316 to provide the appropriate contact to the photodiode 1318. Isolation barriers 1426 are formed to isolate the VCSEL 1301 and the photodiode 1318 from other devices being formed on the substrate 1316. An aperture 1428 is oxidized into the top mirror 1302. The aperture 1428 is used primarily to direct current flow through the VCSEL 1301.

More specifically, the optoelectronic device 1400 is fabricated from an epitaxial structure 1300. The epitaxial structure 1300 has a dielectric, such as silicon dioxide or silicon nitride, grown on it to form a portion of the dielectric layer 1430. A shallow trench mask is used to remove portions of the oxide using an etching process. An etch process is used to form the shallow trench 1432 in the VCSEL 1301. The aperture 1428 can then be oxidized into the VCSEL 1301.

A deep trench mask can then be used to etch the deep trench 1434. An etch can be used to etch down to a thick AlAs spacer 1311. This spacer may be AlAs or another AlGaAs composition, so long as the fraction of aluminum is substantially greater than that in the underlying layer. A stop etch may be used to etch through the AlAs spacer 1311 to the n+ layer 1310. Another etch can be used to etch through the n+ layer 1310 to the p+ layer 1312. At this point, an additional oxide may be grown that forms additional portions of the dielectric layer 1430. Portions of the dielectric layer 1430 are removed followed by deposition of metal to form contacts 1422, 1424 on the optoelectronic device 1400.

Figure 14B:
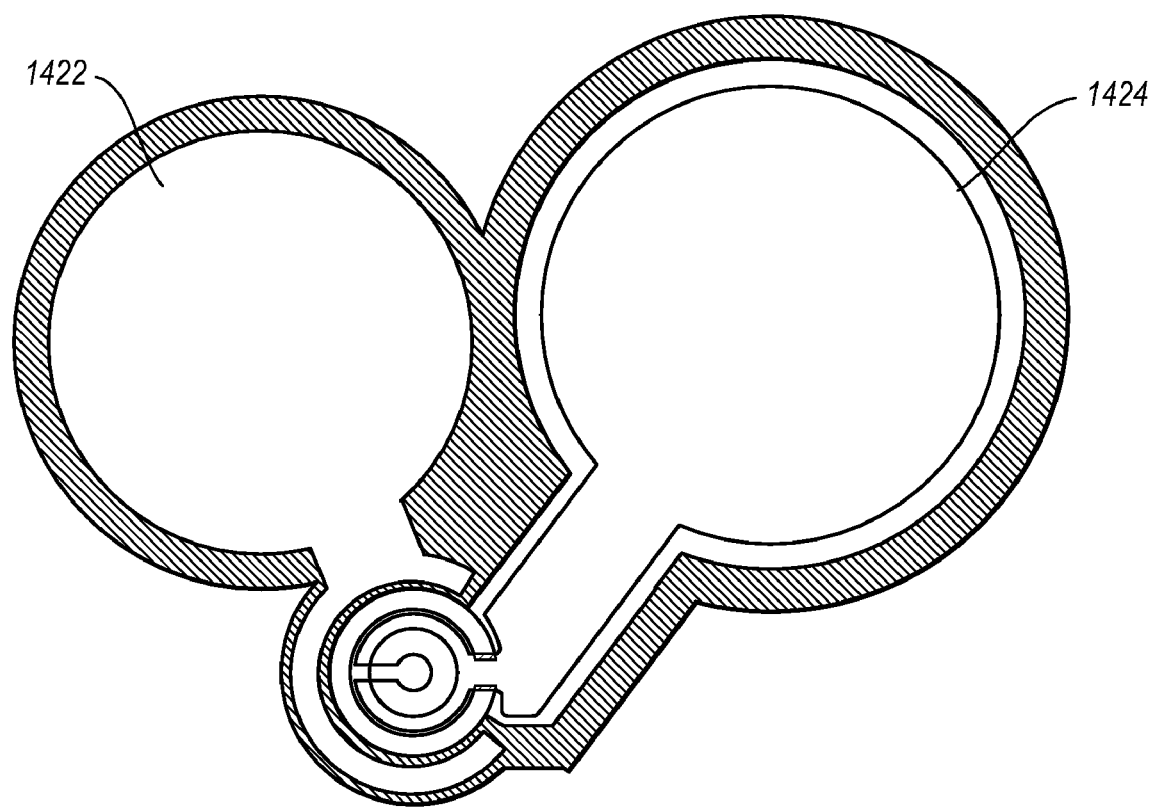

A top view of the optoelectronic device structure and contacts is shown in FIG. 14B. FIG. 14B illustrates the placement of the tunnel junction contact 1422 and the VCSEL contact 1424. While a single tunnel junction contact 1422 is shown, in other embodiments, an additional tunnel junction contact may be formed opposite the tunnel junction contact 1422 to provide for additional wire bonding options when packaging the optoelectronic device structure.

3. Illustrative Optical Networks for Consumer Electronics

Optical networks according to example embodiments can distribute digital video and/or digital audio from a source device to multiple sink devices. The optical networks can distribute distinct digital video and/or digital audio data to different sink devices, or the optical networks can distribute the same digital video and/or digital audio data to the different sink devices.

Figure 15:
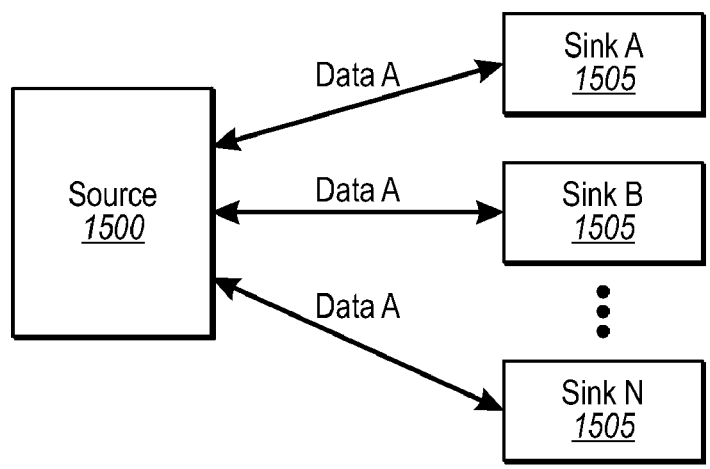
FIG. 15 illustrates an optical network including a digital source device that distributes a digital video and/or audio signal to multiple sink devices.

For example, referring to FIG. 15, an optical network is shown including a digital source device 1500 that distributes a digital video and/or audio signal (Data A) to multiple sink devices 1505 (Sinks A-N). In this embodiment, the same data (Data A) is distributed to the multiple sink devices 1505. Data A can be digital video and/or digital audio data according to the DVI standard or the HDMI standard, for example. Data A can also include a return signal, such as control, status, and/or DOC data according the HDMI standard. Data A can also be transmitted in a single direction from the source 1500 to the multiple sinks 1505 without a return signal in the opposite direction. The optical network illustrated in FIG. 15 can include transmission of electrical TMDS signals, which can be converted into at least one optical signal for transmission to the multiple sinks 1505. The at least one optical signals can be split or reproduced and received by multiple sinks 1505 as illustrated in FIG. 15. The split or reproduced optical signals can be further split or reproduced "down stream" and distributed to additional sinks, such that each sink receives a copy of Data A.

Optical networks according to the embodiment illustrated in FIG. 15 can be particularly advantageous in environments where it is desirable to display an output from the source device 1500 on the multiple sink devices 1505. For example, in the retail industry where multiple digital televisions display digital video and output audible digital audio, it may be desirable to have a single digital video and audio source device (e.g., a DVD player) provide the same HDMI signals to the multiple digital televisions. In this manner, a consumer can view the same video data and hear the same audio data on the multiple televisions simultaneously and make a comparison between the different televisions. Thus, implementing optical networks according to the embodiment shown in FIG. 15 can allow for simultaneous display of video data and/or audio data on multiple sink devices.

Figure 16:
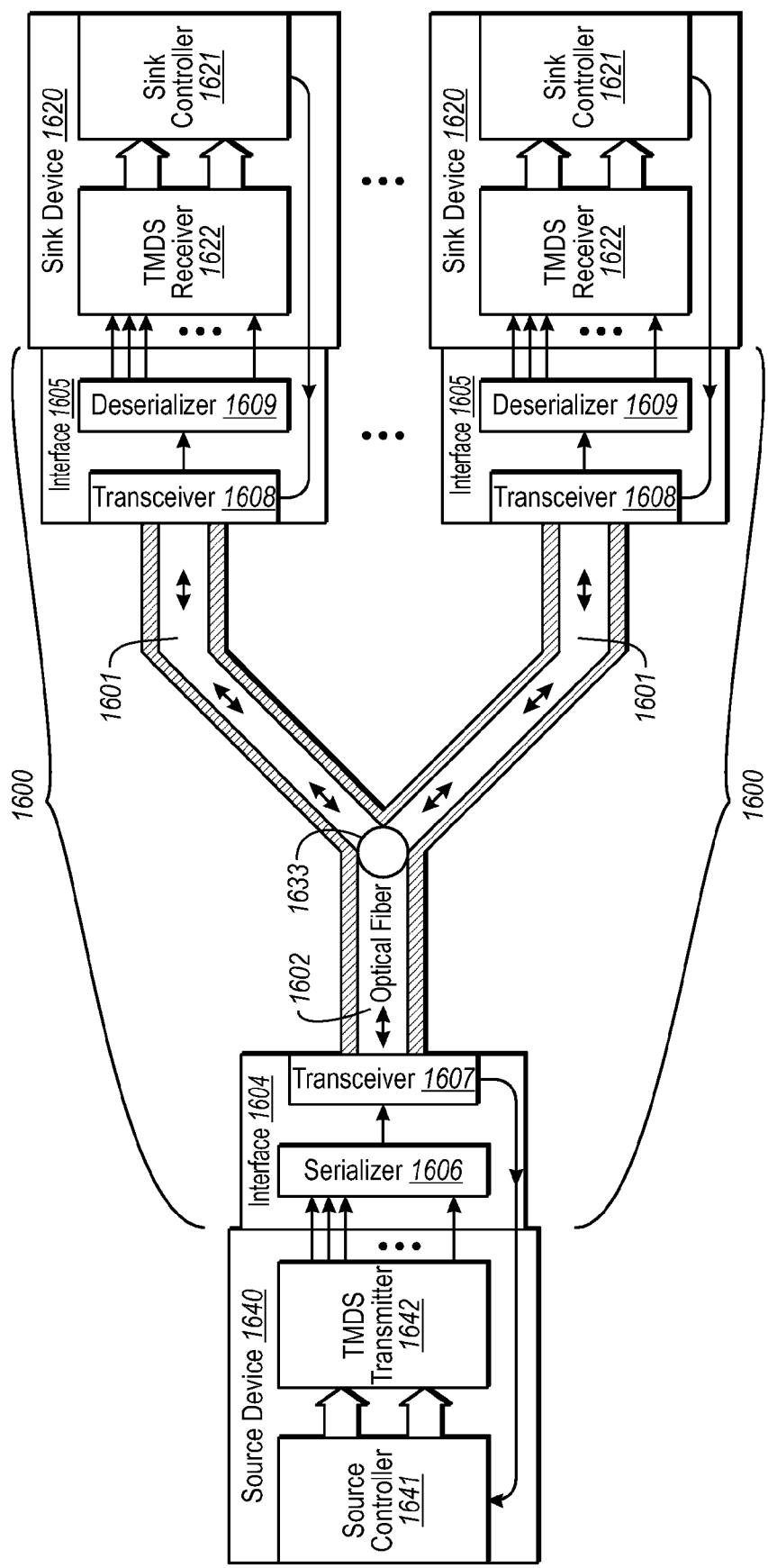
FIG. 16 illustrates an optical network for distributing the same digital video and/or digital audio data to multiple sink devices.

Referring to FIG. 16, an optical network 1600 is illustrated for distributing the same digital video and/or digital audio data to multiple sink devices 1620. The optical network 1600 can be embodied by an optical cable having a single input interface 1604 for electronically coupling to a single source device 1640 and multiple output interfaces 1605 for electronically coupling the optical network 1600 to the multiple digital sink devices 1620. The input cable interface 1604 can be coupled to an input optical fiber 1602. The input optical fiber 1602 can be coupled to multiple output optical fibers 1601 by a coupler 1633. The coupler 1633 can be an optical fiber coupler for splitting optical signals from the input optical fiber 1602 onto each of the multiple output optical fibers 1601 and/or for coupling optical signals sent in the opposite direction from the output optical fibers 1601 to the input optical fiber 1602. In this manner, the digital video and/or digital audio output from the digital source device 1640 can be displayed and/or audibly output on the multiple digital sink devices 1620 simultaneously.

The optical network 1600 can be a bidirectional digital optical network. As shown in FIG. 16, the input interface 1604 of the digital optical network 1600 is coupled to a digital source device 1640 (e.g., a DVI or HDMI source device), and the output interfaces 1605 of the digital optical network 1600 are coupled to multiple sink devices 1620 (e.g., DVI or HDMI sink devices). According the embodiment shown in FIG. 16, the input optical fiber 1602 and output optical fibers 1601 are used for data transmission from the source device 1640 to the sink devices 1620, and for the transmission of return signals in the opposite direction from the sink devices 1620 to the source device 1640.

Each interface 1604 and 1605 can include a fiber optic transceiver 1607 and 1608 respectively for bidirectional optical communication. A transceiver can be both a means for converting an electrical signal to an optical signal, and also a means for converting an optical signal to an electrical signal. In a unidirectional embodiment the transceivers 1607 and 1608 will only convert the signals in a single direction. Several different transceiver embodiments can be implemented, as discussed. Any of the embodiments discussed herein that include optical subassemblies and optical components can include the embodiments discussed above with reference to FIGS. 8A-14B for sending and/or receiving optical data.

The optical network 1600 can be used to transfer TMDS signals from the digital source device 1640 to the digital sink devices 1620. The optical network 1600 can also be used to transfer return data in the opposite direction. In an HDMI embodiment, the optical network 1600 can be used to transfer the DDC and CEC signals in the direction from the digital sink devices to the digital source device.

Figure 1:
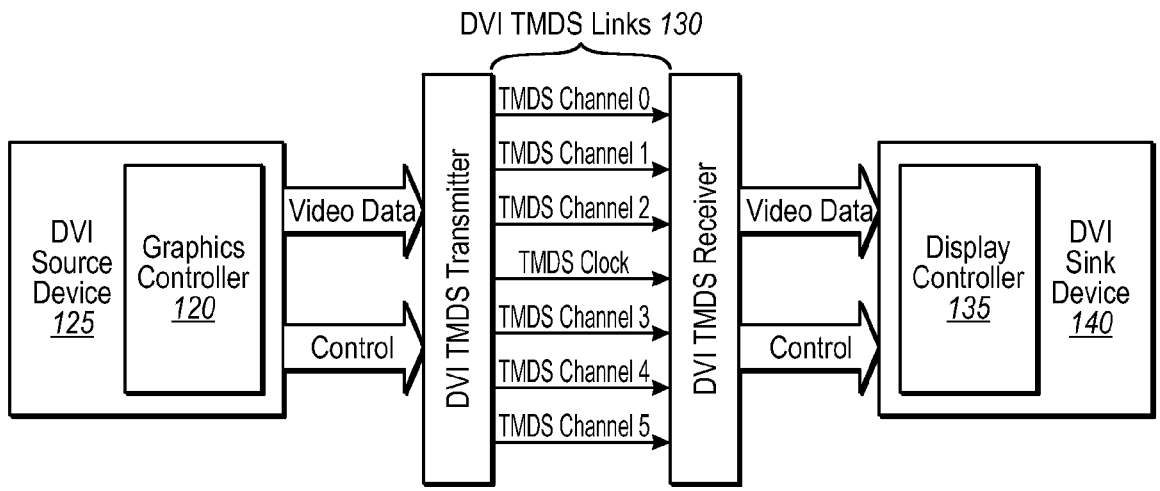
FIG. 1 illustrates the typical flow of data from the graphics controller of a DVI source to the display controller of a DVI sink device.

In operation, control and digital video and/or digital audio signals are transmitted from a source controller 1641 to a TMDS transmitter 1642 within the digital source device 1640. The TMDS transmitter 1642 receives the control and digital video and/or digital audio signals and converts the control and digital video and/or digital audio signals into TMDS signals according to an applicable standard (e.g., DVI or HDMI standard as described with reference to FIGS. 1 and 2). The TMDS signals are received by a serializer 1606, which serializes the TMDS signals into a serialized electrical signal. The serialized electrical signal is received by an input transceiver 1607, which converts the serialized electrical signal into a serialized optical signal and transmits the serialized optical signal to the input optical fiber 1602. The optical coupler 1633 receives the serialized optical signal and splits the serialized optical signal into two serialized optical signals, the serialized optical signals being received by one of the two output optical fibers 1601. Transceivers 1608 within each of the output interfaces 1605 receive the split optical signals from the optical coupler 1633. The transceivers convert the split optical signals to serialized electrical signals and transmit the serialized electrical signals to the corresponding deserializers 1609. The deserializers 1609 deserialize the split optical signals back into the TMDS signals. The TMDS signals are received by TMDS receivers 1622 within each of the sink devices 1620. The TMDS receivers 1622 convert the TMDS signals back into control and digital video and/or audio data and transmit the control and digital video and/or digital audio data to the sink controllers 1621. The sink devices 1620 can be the same or different types of sink devices.

In a bidirectional network embodiment, return signals can be transmitted in a direction from the sink devices 1620 to the source device 1640. In operation, the sink devices 1620 transmit an electrical return signal (or multiple return signals) to the transceivers 1608 within the output interfaces 1605. The transceivers 1608 within the output interfaces 1605 convert the electrical return signals into optical return signals and transmit the optical return signals to the output optical fibers 1601. The coupler 1633 receives the return signals from the output optical fibers and transmits the return optical signals across the input optical fiber 1602 to the input interface 1604. The transceiver 1607 within the input interface 1604 receives the optical return signals and converts the optical return signals into electrical return signals. The electrical return signals are then transmitted from the transceiver 1607 within the cable interface 1604 to the source controller 1641.

The transceivers 1608 within the output interfaces 1605 can be configured to transmit optical return signals at different wavelengths such that when combined by the coupler 1633 the optical return signals combine to create a multiplexed optical return signal. In this manner, the optical return signals can be transmitted simultaneously across the input optical fiber 1602 to the transceiver 1607 within the input interface 1604. The transceiver 1607 within the input interface 1604 can include filters and/or receivers for separating the optical return signals based on their wavelength and for transmitting the electrical return signals separately to the source controller 1641 or with an indication of the sink device 1620 from which the return optical signal originated. Thus, the source controller 1641 can receive the return optical signals and recognize the sink device 1620 from which the return optical signal originated based on the wavelength at which the return optical signal was transmitted.

According to other example embodiments, WDM, PDM, and TDM may be implemented in either direction for communication across the optical fibers 1601 and 1602. However, in some instances the highest speed communication may only be necessary in one direction (e.g., from the source device 1640 to the sink device 1620), but not necessarily in the opposite return direction.

Power for the fiber optic components can be supplied by the 5 VDC power source connection located on standard cables (e.g., DVI and HDMI cables). Power for the fiber optic components may also be supplied externally, or internally, to the fiber optic components of the network from other exterior power sources or internal power sources.

Figure 17:
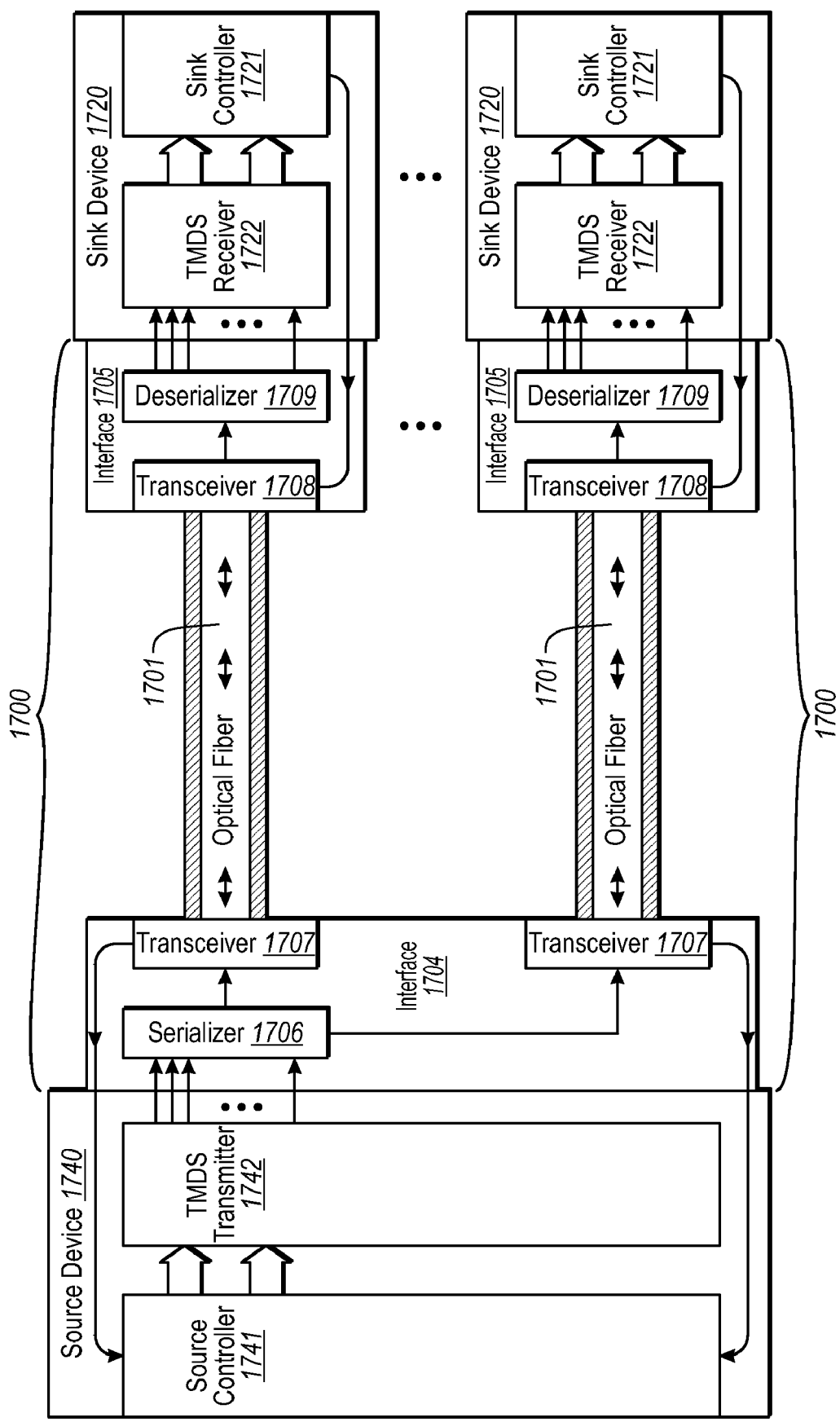
FIG. 17 illustrates an optical network for distributing the same digital video and/or digital audio data to multiple digital sink devices.

Referring to FIG. 17, an optical network 1700 is illustrated for distributing the same digital video and/or digital audio data to multiple digital sink devices 1720. This embodiment includes multiple electrical outputs from a serializer 1706 within an input interface 1704 for serializing a digital video and/or digital audio signal transmitted by a digital source device 1740 and transmitting multiple serialized electrical signals. The optical network can be embodied by an optical cable having a single input interface 1704 for electronically coupling the network 1700 to the single digital source device 1740 and multiple output interfaces 1705 for electronically coupling the network 1700 to multiple digital sink devices 1720.

The input interface 1704 can include two transceivers 1707 for receiving the two electrical serialized signals from the serializer 1706, converting the electrical serialized signals into optical serialized signals, and transmitting the optical serialized signals onto the optical fibers 1701. The optical serialized signals can be receive by two output transceivers 1708, each output transceiver 1708 being located within output interfaces 1705. The output transceivers 1708 receive the optical serialized signals, convert the optical serialized signals back into electrical serialized signals, and transmit the electrical serialized signals to deserializers 1709 located within each output interface 1705. The deserializers 1709 deserialize the serialized electrical signals back into TMDS signals and transmit the TMDS signals to TMDS receivers 1722 within each of the sink devices 1720 (e.g., according to the DVI or HDMI standards). The TMDS receivers 1722 receive the TMDS signals and convert the TMDS signals into control and digital video and/or digital audio data. The TMDS receivers 1722 transmit the control and digital video and/or digital audio data to sink controllers 1721 within the sink devices 1720 for display and/or output.

The optical network 1700 can be a bidirectional digital optical network. As shown in FIG. 17, the input interface 1704 of the digital optical network 1700 is coupled to a digital source device 1740 (e.g., a DVI or HDMI source device), and the output interfaces 1705 of the digital optical network 1700 are coupled to multiple sink devices 1720 (e.g., DVI or HDMI sink devices). The sink devices 1720 can transmit electrical return signals (e.g., configuration, control, status, DOC, and/or CEC signals). The electrical return signals can be transmitted from the sink controllers 1721 to the output transceivers 1708. The output transceivers 1708 can receive the electrical return signals, convert the electrical return signals to optical return signals, and transmit the optical return signals to the optical fibers 1701 coupled to the corresponding output transceiver 1708. The optical return signals can be received by the input transceivers 1707, converted back into electrical return signals and transmitted to the source controller 1741. The return signals can be transmitted using a single electronic link, or multiple electronic links as shown in FIG. 17.

Each interface 1704 and 1705 can include a transceiver 1707 and 1708 for bidirectional optical communication. A transceiver can be both a means for converting an electrical signal to an optical signal, and also a means for converting an optical signal to an electrical signal. Several different transceiver embodiments can be implemented. Embodiments including optical subassemblies and components can be used to send and receive optical signals over the digital optical network, for example, including embodiments discussed above with reference to FIGS. 9-14B. In the instance that the optical network is unidirectional only, those components needed for transmission in the single direction need be included in the transceiver.

The optical network 1701 can be used to transfer TMDS signals from the digital source device 1740 to the digital sink devices 1720. The optical network 1700 can also be used to transfer return data in the opposite direction. In an HDMI embodiment, the optical network 1700 can be used to transfer the DDC and CEC signals in the direction from the digital sink devices 1720 to the digital source device 1740.

According to other example embodiments, WDM, PDM, and TDM may be implemented in either direction for communication across the optical fibers 1701. However, in some instances the highest speed communication may only be necessary in one direction (e.g., from the source device 1740 to the sink device 1720), but not necessarily in the opposite return direction.

Power for the fiber optic components can be supplied by the 5VDC power source connection located on standard cables (e.g., DVI and HDMI cables). Power for the fiber optic components may also be supplied externally, or internally, to the fiber optic components of the network from other exterior power sources or internal power sources.

Figure 18:
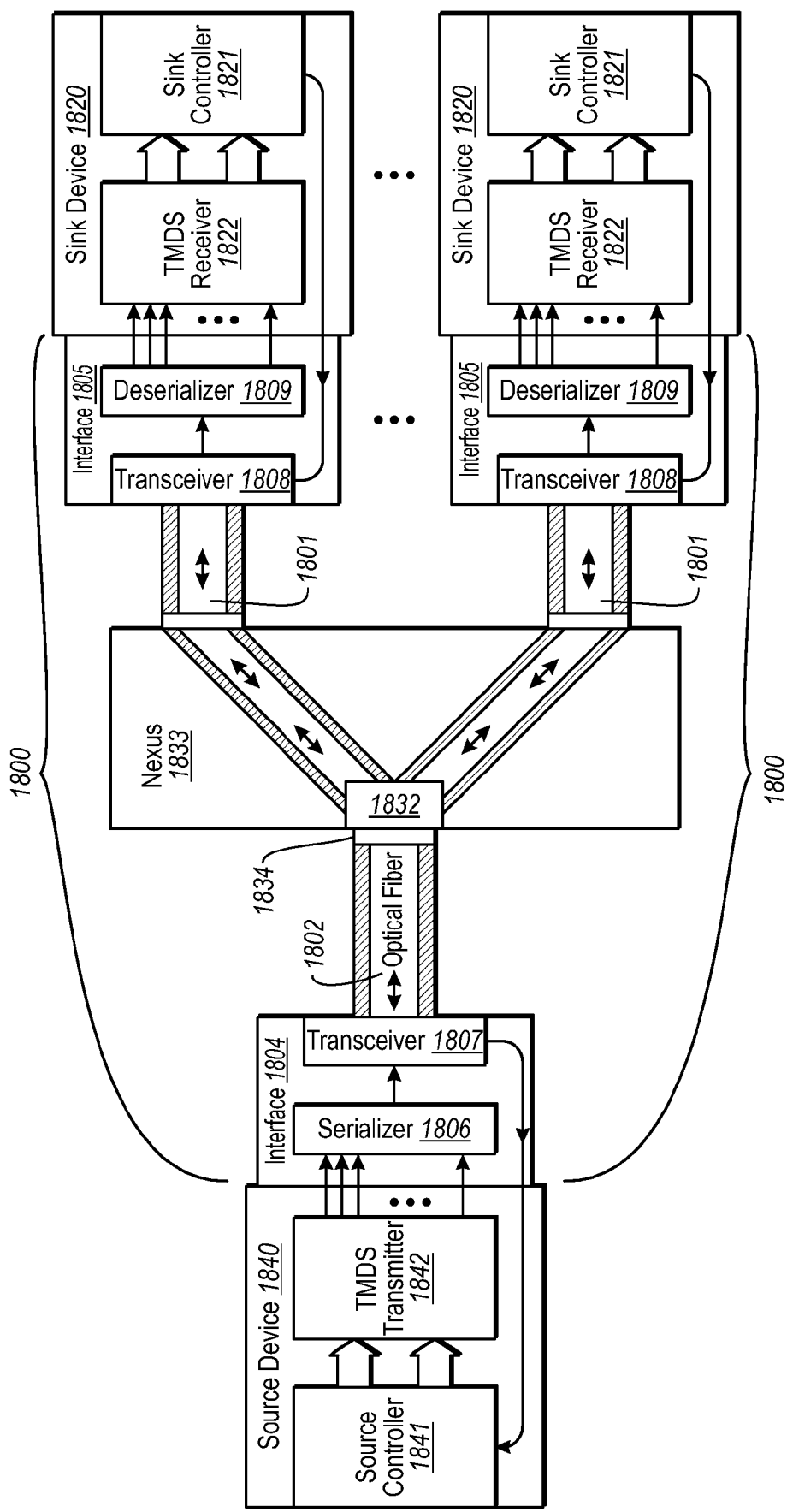
FIG. 18 illustrates an embodiment where a nexus is used to couple a single source device to multiple sink devices.

Referring now to FIG. 18, an embodiment is illustrated where a nexus 1833 is used to couple a single source device 1840 to multiple sink devices 1820. According to this embodiment, the nexus 1833 can include an interface 1834 for optically coupling a coupler 1832 to an input optical fiber 1802. The coupler 1832 receives optical signals from the input optical fiber 1802 and splits the optical signals into multiple output optical fibers 1801 coupled to multiple sink devices 1820 via output interfaces 1805. In bidirectional embodiments, the coupler 1832 can also receive return optical signals from the output optical fibers 1801 and combine the optical return signals into a multiplexed return optical signal for transmission across the input optical fiber 1802 to the input interface 1804.

In operation, a source controller 1841 within the source device 1840 transmits control and digital video and/or digital audio data to a TMDS transmitter 1842 within the source device 1840. The TMDS transmitter 1842 converts the control and digital video and/or digital audio data to TMDS signals and transmits the TMDS signals to a serializer 1806 within an electrically coupled input interface 1804. The serializer 1806 serializes the TMDS signals into an electrical serialized signal and transmits the electrical serialized signal to an input transceiver 1807. The input transceiver converts the electrical serialized signal into an optical serialized signal and transmits the optical serialized signal to the input optical fiber 1802. The optical serialized signal is received by the nexus 1833 and split into two optical serialized signals by the optical coupler 1832. The two optical serialized signals are received by the output optical fibers 1801 optically coupled to the nexus 1833 and the optical serialized signals are received by output transceivers 1808 coupled to the output optical fibers 1801. The output transceivers 1808 receive the optical serialized signals, convert the optical serialized signals into electrical serialized signals, and transmit the electrical serialized signals to deserializers 1809. The deserializers 1809 deserialize the electrical serialized signals into TMDS signals and transmit the TMDS signals to TMDS receivers 1822 within the sink devices 1820. The TMDS receivers 1822 convert the TMDS signals back into control and digital video and/or digital audio data and transmit the control and digital video and/or digital audio data to sink controllers 1821 within the sink devices 1820 for display and/or output.

In the instance that the network 1800 is a bidirectional network, return signals can be transmitted from the sink devices 1820 to the source device 1840. For example, the sink controllers 1821 can transmit electrical return signals to the output transceivers 1808. The output transceivers can convert the electrical return signals into optical return signals and transmit the optical return signals onto the output optical fibers. The optical return signals can be transmitted at different wavelengths such that when they are received by the coupler 1832 within the nexus 1833 they are combined into a multiplexed optical return signal that is received by the input transceiver 1807, converted into electrical return signals, and transmitted to the source controller 1841 separately, or along with an indication of the sink device from which the electrical return signal originated.

In this embodiment, the nexus 1833 can be a separate part to which the input and output cables optically couple. Additional nexuses 1833 can be used to couple additional sink devices 1820 down stream in a series or parallel type arrangement. The nexus 1833 can also have any number of outputs for coupling the source device 1840 to any number of sink devices 1820 or additional nexuses 1833. The nexus 1833 can include additional hardware for amplifying the optical signals such that optical power loss due to splitting the optical signals does not interfere with transmission of the TMDS signals. The coupler 1832 can be any type of coupler for splitting and/or multiplexing optical signals based on, for example, their wavelength or the power at which the optical signals are transmitted.

Optical networks for transmitting digital video and/or digital audio from a single source device to multiple sink devices can include various cable designs discussed herein in conjunction with various nexus designs allowing for distribution of the digital video and/or digital audio signals to the multiple sink devices. For example, referring to FIG. 19, an optical network 1900 for communication between a source device 1940 and multiple sink devices 1920 is illustrated. The network 1900 can include an input optical cable 1917 for transmission of digital video and/or digital audio from the source device 1940 to a nexus 1933. The nexus 1933 can be configured to distribute the digital video and/or digital audio to multiple output optical cables 1918 coupled to multiple digital sink devices 1920. It should be appreciated that the input optical cable 1917 and the output optical cables 1918 can be the same cable design as illustrated in FIG. 8A, or the input optical cable 1917 and the output optical cables 1918 can be different designs as discussed above with reference to FIGS. 1-8B. The nexus 1933 can also couple directly to the source device 1940 receiving the TMDS signals directly from the source device 1940 thereby eliminating the need for an input optical cable 1917.

Figure 19:
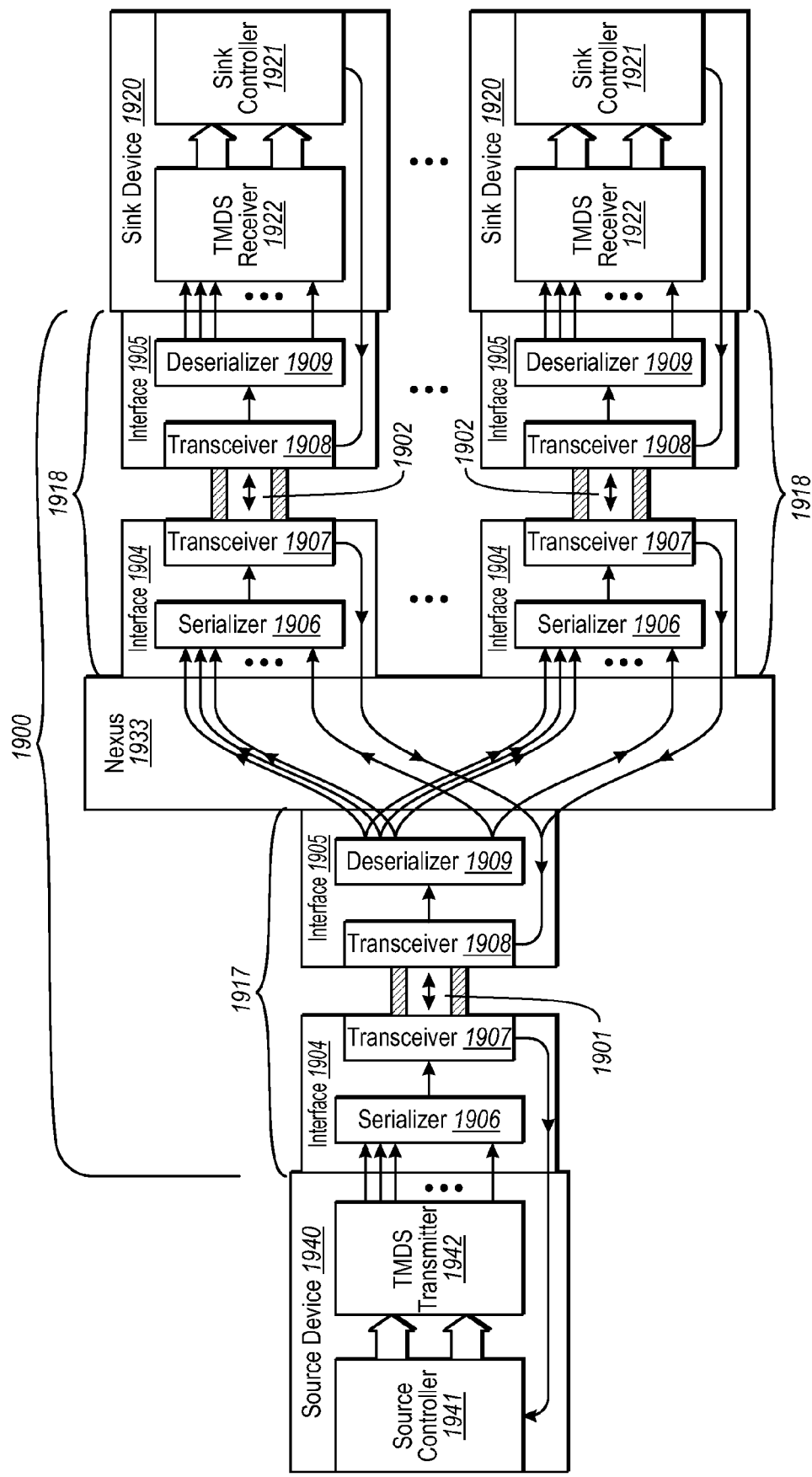
FIG. 19 illustrates an optical network for communication between a source device and multiple sink devices.

In operation, a source controller 1941 within the source device 1940 transmits control and digital video and/or digital audio data to a TMDS transmitter 1942. The TMDS transmitter 1942 converts the control and digital video and/or digital audio data to TMDS signals and transmits the TMDS signals to a serializer 1906 within a first interface 1904 of the input optical cable 1917. The serializer 1906 serializes the TMDS signals into an electrical serialized signal and transmits the electrical serialized signal to an input transceiver 1907 within the first interface 1904 of the input optical cable 1917. The first transceiver 1907 converts the electrical serialized signal into an optical serialized signal and transmits the optical serialized signal to an input optical fiber 1901. A second transceiver 1908 within a second interface 1905 of the input optical cable 1917 receives the serialized optical signal, converts the serialized optical signal into a serialized electrical signal, and transmits the serialized electrical signal to a deserializer 1909 within the second interface 1905 of the input optical cable 1917. The deserializer 1909 deserializes the electrical serialized signal back into TMDS signals and transmits the TMDS signals to the nexus 1933. The nexus 1933 receives the TMDS signals and transmits the TMDS signals to both of the output optical cables 1918. The TMDS signals are received by serializers 1906 within first interfaces 1904 of the output optical cables 1918. The serializers 1906 serialize the TMDS signals back into electrical serialized signals and transmit the electrical serialized signals to first transceivers 1907 within the first interfaces 1904 of the output optical cables 1918. The first transceivers 1907 receive the electrical serialized signals, convert the electrical serialized signals into optical serialized signals and transmit the optical serialized signals onto output optical fibers 1902. The optical serialized signals are received by second transceivers 1908 within second interfaces 1905 of the output optical cables 1918. The second transceivers 1908 convert the optical serialized signals into electrical serialized signals and transmit the electrical serialized signals to deserializers 1909 within the second interfaces 1905 of the output optical cables 1918. The deserializers 1909 deserialize the electrical serialized signals back into TMDS signals and transmit the TMDS signals to TMDS receivers 1922 within the sink devices 1920. The TMDS receivers 1922 convert the TMDS signals into control and digital video and/or digital audio signals and transmit the control and digital video and/or digital audio signals to sink controllers 1921 within the sink devices 1920 as illustrated in FIG. 19.

In the instance that the network is a bidirectional network, return signals can be transmitted from the sink devices 1920 to the source device 1940. For example, the sink controllers 1921 can transmit electrical return signals to the second transceivers 1908, which convert the electrical return signals into optical return signals and transmit the optical return signals to the output optical cables 1902. The optical return signals are received by the first transceivers 1907 within the first interfaces 1904 of the output optical cables 1918. The first transceivers 1907 convert the optical return signals into electrical return signals and transmit the electrical return signals to the nexus 1933. The nexus transmits the electrical return signals to the second transceiver 1908 of the input optical cable 1917, which converts the electrical return signals into optical return signals and transmits the optical return signals to the input optical fiber 1901. The transceivers 1908 can include multiple transmitters for transmitting return signals at different wavelengths thereby producing multiplexed return optical signals for transmission across the optical fibers 1901 and 1902. The return optical signals are received by the first transceiver 1907 of the input optical cable 1917 (e.g., using receivers for detecting optical signals at the different wavelengths) and converted back into electrical return signals. The electrical return signals can be received by the source controller 1941 separately or with an indication of the sink device from which the electrical return signal originated.

According to several embodiments it may be advantageous to reduce the conversion of the TMDS data from one form to another. For example it may be advantageous to eliminate conversions of the signals from the electrical form to the optical form (e.g., see FIG. 19). It may also be desirable to eliminate the number of times that the signal is serialized or deserialized, for example, to simplify the design and/or eliminate components. For example, referring to FIG. 20, an optical network 2000 is illustrated for distributing control and digital video and/or digital audio data from a single source device 2040 to multiple sink devices 2020. According to this embodiment an electrically serialized signal is received from an input optical cable 2017 by a nexus 2033 and distributed to multiple output optical cables 2018 without deserializing or reserializing the signal (as compared to the embodiment illustrated in FIG. 19).

Figure 20:
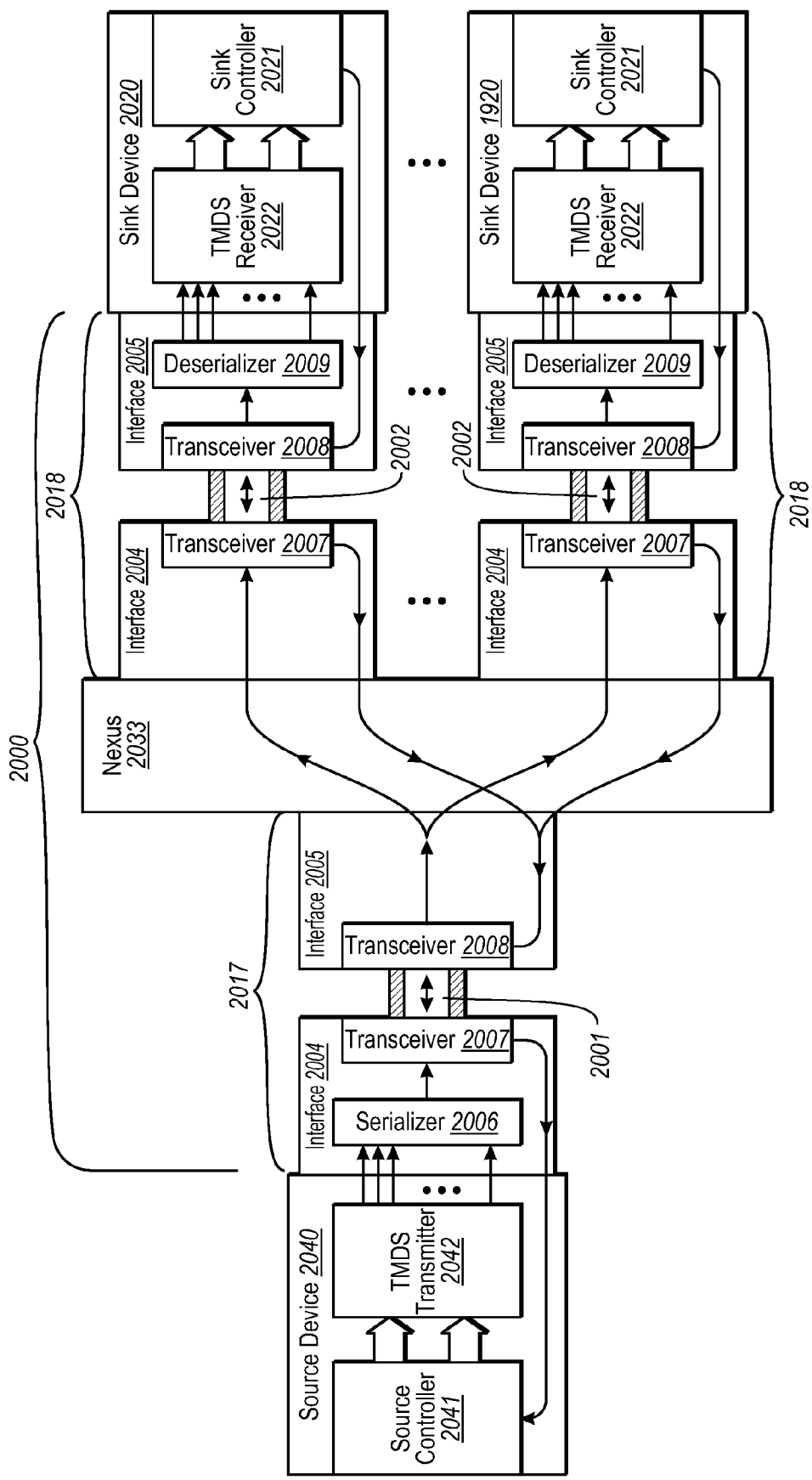
FIG. 20 illustrates an optical network for distributing digital video and/or optical signals from a single source device to multiple sink devices.

In operation, a source controller 2041 within the source device 2040 transmits control and digital video and/or digital audio data to a TMDS transmitter 2042. The TMDS transmitter 2042 converts the control and digital video and/or digital audio data to TMDS signals and transmits the TMDS signals to a serializer 2006 within a first interface 2004 of the input optical cable 2017. The serializer 2006 serializes the TMDS signals into an electrical serialized signal and transmits the electrical serialized signal to a first transceiver 2007 within the first interface 2004 of the input optical cable 2017. The first transceiver 2004 converts the electrical serialized signal into an optical serialized signal and transmits the optical serialized signal to an input optical fiber 2001. A second transceiver 2008 within a second interface 2005 of the input optical cable 2017 receives the serialized optical signal, converts the serialized optical signal into a serialized electrical signal, and transmits the serialized electrical signal to the nexus 2033. The nexus 2033 receives the electrical serialized signal and transmits the electrical serialized signal to both of the output optical cables 2018. The electrical serialized signals are received by first transceivers 2007 within first interfaces 2004 of the output optical cables 2018. The first transceivers 2007 receive the electrical serialized signals, convert the electrical serialized signals into optical serialized signals and transmit the optical serialized signals onto output optical fibers 2002. The optical serialized signals are received by second transceivers 2008 within second interfaces 2005 of the output optical cables 2018. The second transceivers 2008 convert the optical serialized signals into electrical serialized signals and transmit the electrical serialized signals to deserializers 2009 within the second interfaces 2005 of the output optical cables 2018. The deserializers 2009 deserialize the electrical serialized signals back into TMDS signals and transmit the TMDS signals to TMDS receivers 2022 within the sink devices 2020. The TMDS receivers 2022 convert the TMDS signals into control and digital video and/or digital audio signals and transmit the control and digital video and/or digital audio signals to sink controllers 2021 within the sink devices 2020 as illustrated in FIG. 20.

In the instance that the network is a bidirectional network, return signals can be transmitted from the sink devices 2020 to the source device 2040. For example, the sink controllers 2021 can transmit electrical return signals to the second transceivers 2008, which convert the electrical return signals into optical return signals and transmit the optical return signals to the output optical fibers 2002. The optical return signals are received by the first transceivers 2007 within the first interfaces 2004 of the output optical cables 2018. The first transceivers 2007 convert the optical return signals into electrical return signals and transmit the electrical return signals to the nexus 2033. The nexus 2033 transmits the electrical return signals to the second transceiver 2008 of the input optical cable 2017, which converts the electrical return signals into optical return signals and transmits the optical return signals to the input optical fiber 2001. The transceivers 2008 can include multiple transmitters for transmitting return signals at different wavelengths thereby producing a multiplexed return optical signal for transmission across the optical fibers 2001 and 2002. The return optical signals are received by the first transceiver 2007 of the input optical cable 2017 (e.g., using receivers for detecting optical signals at the different wavelengths) and converted back into electrical return signals. The electrical return signals can be received by the source controller 2041 separately or along with an indication of the sink device 2020 from which the electrical return signal originated.

Figure 21:
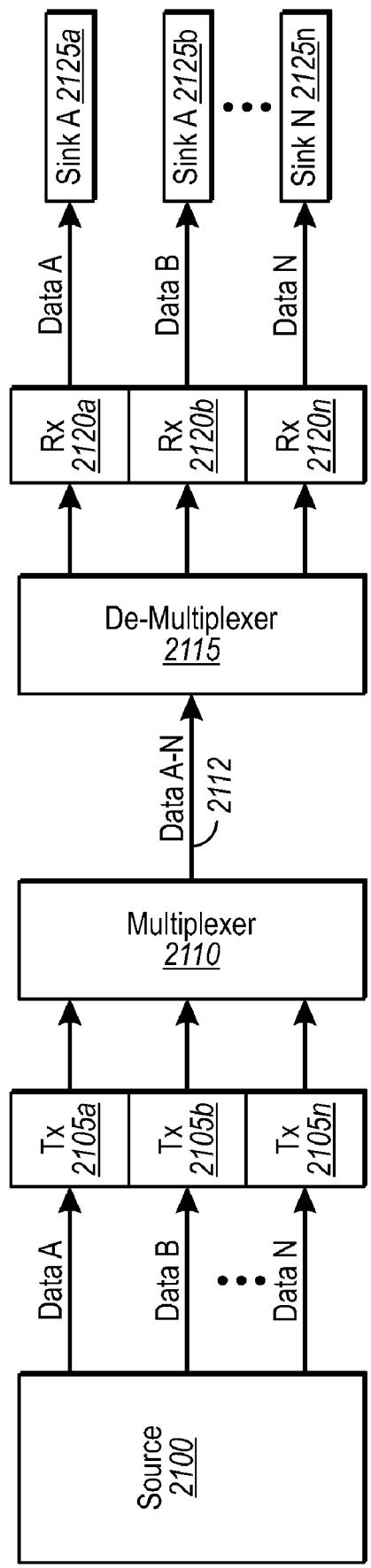
FIG. 21 illustrates a network including a digital source device for distributing different digital video and/or digital audio signals to different sink devices.

Referring to FIG. 21, a network including a digital source device 2100 can distribute different digital video and/or digital audio signals (Data A-N) to different Sinks A-N. The data can be data intended for a particular Sink. For example, Data A can be intended for Sink A, Data B can be intended for Sink B, and so on. In this manner, the single source device 2100 can communicate with multiple Sinks A-N across the optical network. Data A-N can be sent across a single optical fiber 2112 or multiple optical fibers. For example, the Data A-N can be multiplexed and sent across the single optical fiber 2112. Data A-N can be sent across the single optical fiber 2112 using TDM, WDM, or power division multiplexing (PDM), for example.

Optical networks according to the embodiment illustrated in FIG. 21 can be particularly advantageous in environments where it is desirable for a single source device to control multiple sink devices simultaneously and independent of the other sink devices. In the instance that a data processing source device (e.g., a computer) is controlling multiple display sink devices (e.g., computer monitors) according to the HDMI or DVI standards it may be advantageous for a user to view independent data on multiple display devices. For example, a user may be able to expand the display desktop of a computer system by simply adding an additional screen and configuring the computer to display independent data on each screen. This may also be advantageous for watching multiple sports programs simultaneously. In this manner an optical network according to the embodiment shown in FIG. 21 can be used to simply and efficiently expand the display surface of a system with minimal hardware and configuration.

As illustrated in FIG. 21, the source device 2100 can transmit different electrical digital video and/or digital audio data (Data A-N), such as sets of TMDS signals. The different electrical digital video and/or digital audio data (Data A-N) can be intended for different digital sink devices (Sinks A-N). The different electrical digital video and/or digital audio data can be received by several optical transmitters 2105a-n. The optical transmitters 2105a-n can convert the electrical digital video and/or digital audio data into optical digital video and/or digital audio data and transmit the optical digital video and/or digital audio data to a multiplexer 2110. The multiplexer 2110 can multiplex the optical digital video and/or digital audio data into a multiplexed optical signal and transmit the multiplexed optical signal to the optical fiber 2112. A demultiplexer 2115 can receive the multiplexed optical signal and demultiplex the multiplexed optical signal back into the optical digital video and/or digital audio data. The optical digital video and/or digital audio data can be received by optical receivers 2120a-n that receive the optical digital video and/or digital audio data, convert the optical digital video and/or digital audio data into electrical digital video and/or digital audio data (Data A-N), and transmit the electrical digital video and/or digital audio data (Data A-N) to the sink devices 2125a-n (Sinks A-N). The multiplexed digital video and/or digital audio data can be directed to the appropriate sink based on the wavelength at which the optical digital video and/or digital audio data is received.

Figure 22:
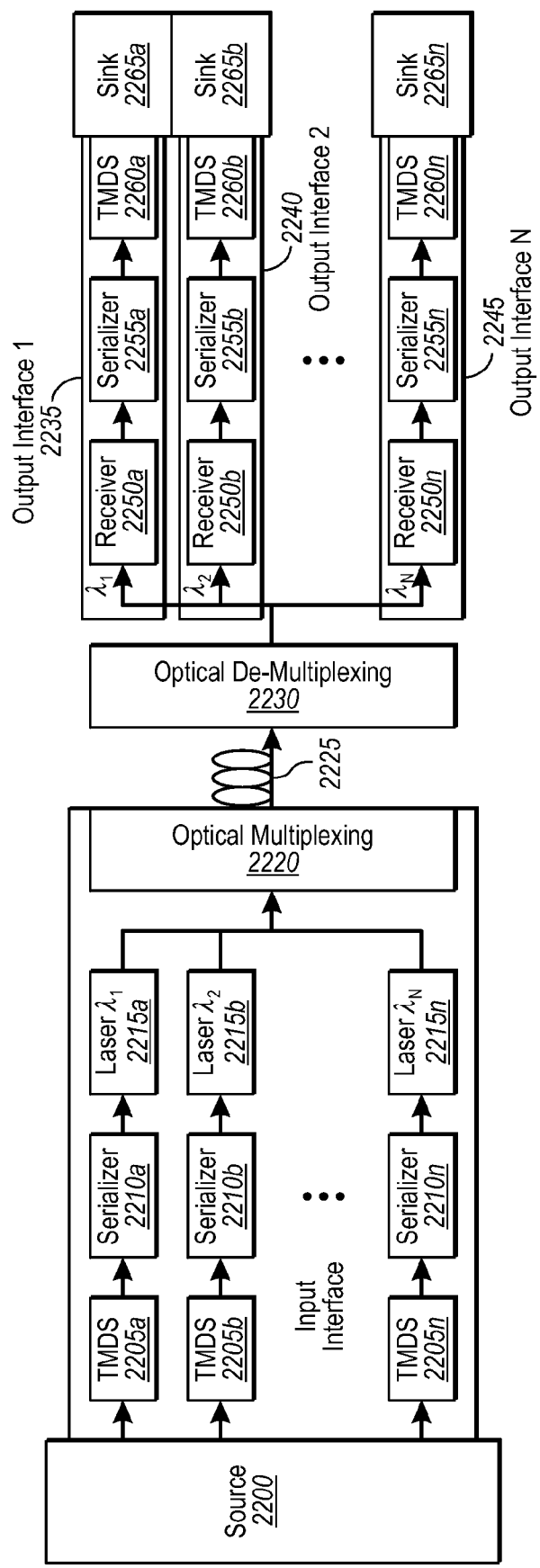
FIG. 22 illustrates a network for transmitting different digital video and/or audio data from a digital source device to different sink devices.

Referring to FIG. 22, a network for transmitting different digital video and/or digital audio data from a digital source device 2200 to different sink devices 2265a-n is illustrated. The source device 2200 can transmit several sets of TMDS signals 2205a-n intended for different sink devices 2265a-n. The sets of TMDS signals 2205a-n can be TMDS signals conforming to the DVI or HDMI standards (e.g., see FIGS. 1 and 2). The sets of TMDS signals 2205a-n can be received by serializers 2210a-n, which serialize the sets of TMDS signals 2205a-n into electrically serialized signals. The electrically serialized signals can be received by lasers 2215a-n. The lasers 2215a-n convert the electrically serialized signals into optical signals at different wavelengths. The optical signals at different wavelengths can be received by an optical multiplexer 2220, which can multiplex the optical signals into a multiplexed optical signal. The multiplexed optical signal can be transmitted over an optical link 2225 to an optical demultiplexer 2230 the optical demultiplexer 2230 demultiplexes the multiplexed optical signal back into the optical signals of different wavelengths. Optical receivers 2250a-n of interfaces 2235, 2240, and 2245 receive the optical signals of different wavelengths and convert the optical signals back into electrically serialized signals. The electrically serialized signals are received by deserializers 2255a-n and deserialized back into the sets of TMDS signals 2260a-n (e.g., conforming to the DVI or HDMI standards). The sets of TMDS signals 2260a-n are received by the different sink devices 2265a-n for display of the digital video and/or digital audio data transmitted by the digital source device 2200.

Figure 23:
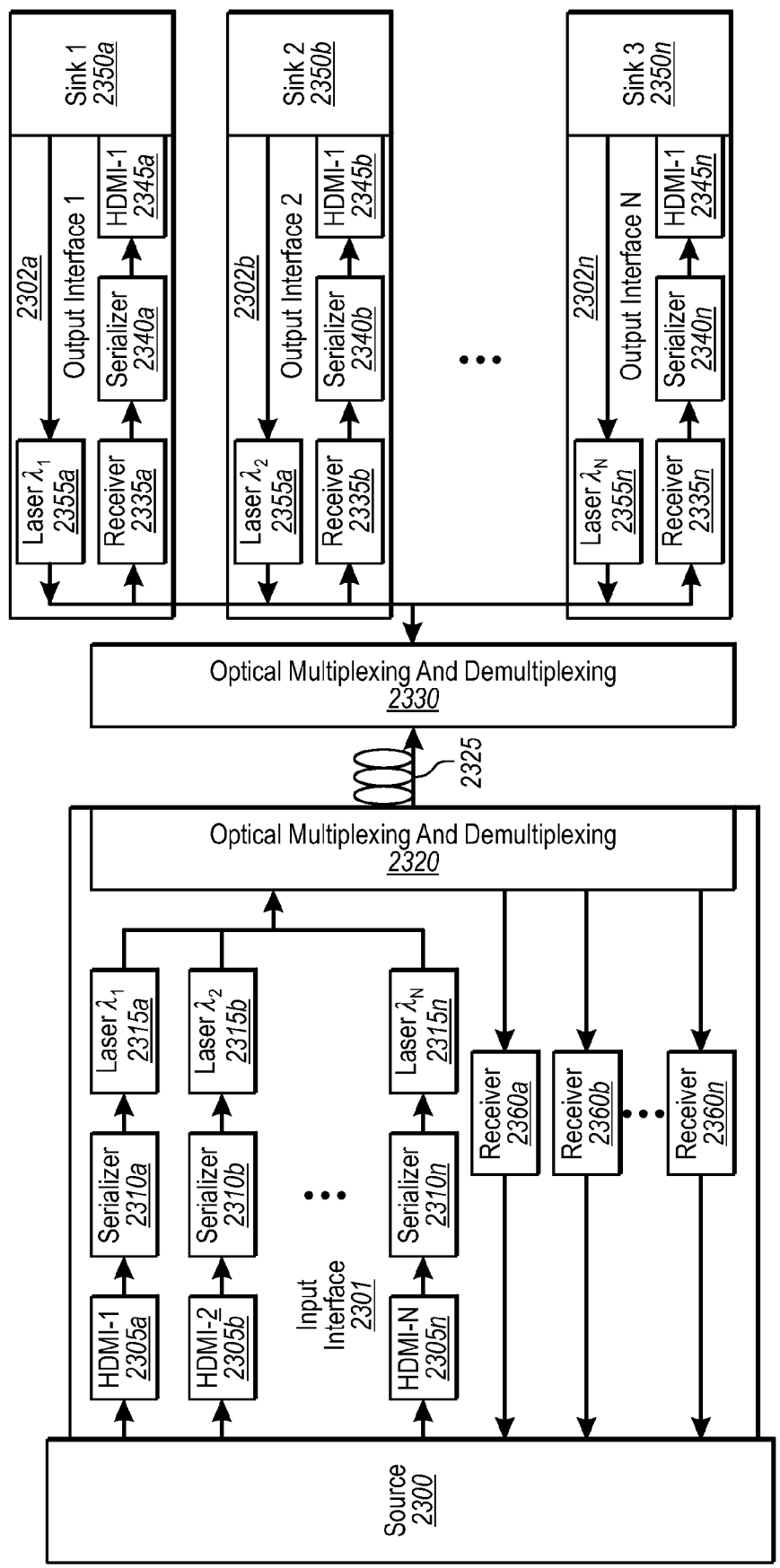
FIG. 23 illustrates an optical network for transmitting HDMI signals between a source device and multiple sink devices.

Referring to FIG. 23, an optical network for transmitting HDMI signals between a source device 2300 and multiple sink devices 2350a-n is illustrated. The source device 2300 transmits sets of HDMI data 2305a-n intended for different sink devices 2350a-n to an input interface 2301. The sets of HDMI data 2305a-n are received by serializers 2310a-n and serialized into electrically serialized HDMI data. The electrical serialized HDMI data are transmitted to several lasers 2315a-n, which convert the electrical serialized HDMI data into optical signals at different wavelengths. The optical signals at different wavelengths are received by an optical multiplexing and demultiplexing device 2320. The optical multiplexing and demultiplexing device 2320 multiplexes the optical signals at different wavelengths into a multiplexed signal and transmits the multiplexed signal onto an optical link 2325. The multiplexed signal is received by an optical multiplexing and demultiplexing device 2330, which demultiplexes the multiplexed signal into optical signals at different wavelengths. The optical signals at different wavelengths are received by several receivers 2335a-n, which convert the optical signals at different wavelengths into electrically serialized data. The electrically serialized data is received by several deserializers 2340a-n, which deserialize the electrically serialized data back into HDMI data that are intended for a particular sink, at least one of 2350a-n. The HDMI data are then received by the intended sink, at least one of 2350a-n, and digital video and/or digital audio data contained within the HDMI data are displayed and/or output by the sink(s) 2350a-n that receives the data.

In the instance that HDMI return signals are transmitted from the sink devices 2350a-n to the source device 2300, lasers 2355a-n within the output interfaces 2302a-n can receive the electrical return signals and convert the electrical return signals into return optical return signals at different wavelengths. The return optical signals at different wavelengths can be received by the optical multiplexing and demultiplexing device 2330 and multiplexed into a multiplexed return signal and transmitted onto the optical link 2325. The multiplexed return signal can be received by the optical multiplexing and demultiplexing device 2320 within the input interface 2301 and demultiplexed into return optical signals at different wavelengths. The optical return signals at different wavelengths can be received by several receivers 2360a-n within the input interface 2301 and converted to electrical return signals. The electrical return signals can be received by the source device 2300.

Figure 24:
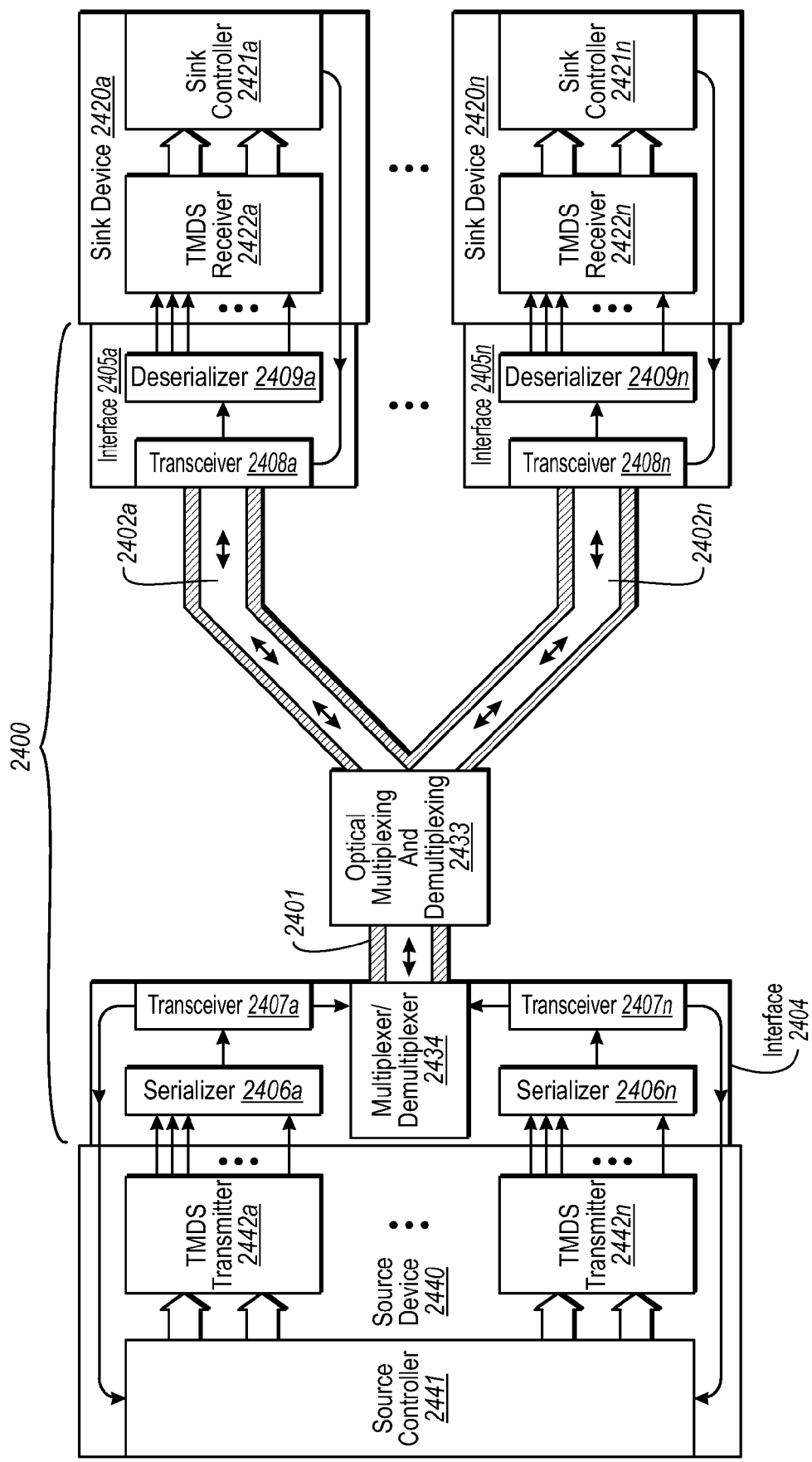
FIG. 24 illustrates an optical network for transmitting TMDS signals between a source device and multiple sink devices.

Referring to FIG. 24, an optical network 2400 for transmitting TMDS signals between a source device 2440 and multiple sink devices 2420a-n is illustrated. The source device 2440 includes a source controller 2441 that transmits control data and digital video and/or digital audio data to multiple TMDS transmitters 2442a-n. The TMDS transmitters 2442a-n convert the control data and digital video and/or digital audio data to sets of TMDS signals. The sets of TMDS signals can conform, for example, to the HDMI or DVI standards discussed above. The sets of TMDS signals are received by serializers 2406a-n and serialized into multiple electrical serialized signals. The electrical serialized signals are received by multiple transceivers 2407a-n, which convert the multiple serialized signals into optical serialized signals. The optical serialized signals are transmitted to a multiplexer/demultiplexer 2434 (e.g., a fiber optical coupler), which multiplexes the optical serialized signal into a multiplexed optical signal and couples the multiplexed optical signal to an input optical fiber 2401. The multiplexed optical signal is received by a demultiplexer/multiplexer 2433 (e.g., a fiber optical coupler) coupled to the input optical fiber 2401, which demultiplexes the multiplexed optical signal back into the two optical serialized signals and couples an optical serialized signal to a different output optical fibers 2402a-n. The optical serialized signals are received by transceivers 2408a-n within output cable interfaces 2405a-n. The transceivers 2408a-n convert the optical serialized signals back into electrical serialized signals and transmit the electrical serialized signals to multiple deserializers 2409a-n. The deserializers 2409a-n deserialize the electrical serialized signals back into sets of TMDS signals and transmit the sets of TMDS signals to the sink devices 2420a-n. TMDS receivers 2422a-n within the sink devices 2420a-n receive the TMDS signals and convert the TMDS signals into control and digital video and/or digital audio signals and transmit the control and digital video and/or digital audio signals to sink controllers 2421a-n for controlling the display and/or output of the digital video and/or digital audio data.

In the instance that electrical return signals are transmitted by the sink devices 2420a-n (e.g., according to the HDMI standard), the return signals are transmitted from the sink controllers 2421a-n to the transceivers 2408a-n within the output interfaces 2405a-n. The transceivers 2408a-n convert the electrical return signals to optical return signals and transmit the optical return signals to the output optical fibers 2402a-n. The demultiplexer/multiplexer 2433 receives the optical return signals, multiplexes the optical return signals into a multiplexed optical return signal and transmits the multiplexed optical return signal onto the input optical fiber 2401. The multiplexer/demultiplexer 2434 receives the multiplexed optical return signal, demultiplexes the multiplexed optical return signal back into the separate optical return signals, and directs the optical return signals to the transceivers 2407a-n within the input interface 2404. The transceivers 2407a-n convert the optical return signals into electrical return signals and transmit the electrical return signals to the source controller 2441 of the source device 2440.

The optical networks illustrated in FIGS. 17-24 can include transceivers for transmitting and receiving optical signals. The transceivers can include bi-directional optical devices discussed herein with reference to FIGS. 10-14B. In the instance that the embodiments only transmit signals in one direction, the transceivers may only require optical transmitters in the input interface for converting electrical signals into optical signals and optical receivers in the output interfaces for converting the optical signals back into electrical signals. In the embodiments where the transceivers are receiving bidirectional optical communication, the transceivers will include both optical receivers and optical transmitters for transmission of optical signals in both directions.

The above described embodiments can be implemented in any environment that optical communication will support. Both multi-mode and/or single-mode embodiments can be used. The embodiments discussed above are described with minimal channels for ease of discussion. However, for embodiments where the signal is split into a very large number of channels, using single-mode at telecommunications wavelengths can be particularly advantageous because of the availability of standard components to do the various functions. For example, the embodiments can benefit from being a 1310 or a 1550 nanometer solution operating on single-mode fiber because there are readily available off-the-shelf components for this type of passive optical network. Other pieces, like amplifiers and other conventional components can also be used in the optical domain. The transceivers can use conventional ROSAs and TOSAs for optical communication, or the transceivers can use other configurations as discussed herein.

While the present invention has been described being implemented in the DVI and HDMI standards for digital video and/or digital audio data transfer, the same teachings may be applied to other digital video and/or digital audio data transfer standards. For example, it would be apparent to one of ordinary skill in the art in view of the present disclosure how to apply the teachings of the present invention to other video data standards such as VESA, LDVS, DFP, as well as others. Such embodiments are included within the scope of the present invention.

In addition, the digital video data communication need not be conducted between the specific consumer electronic devices named in this disclosure. The communication may be between any digital video and/or audio devices configured to use an electronic digital data transfer cable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A digital optical interface device comprising:
    a DVI or HDMI input interface configured to electrically connect to a DVI or HDMI receptacle of a digital source device to receive input TMDS electrical signals from the digital source device, the input interface comprising a serializer for serializing the TMDS signals into a electrical serialized signal and an optical transmitter configured to receive the electrical serialized signal and convert the electrical serialized signal to an input optical signal, the optical transmitter further configured to transmit the input optical signal to an input optical fiber;

a coupler configured to couple the input optical signal with at least two optical output fibers coupled to the input optical fiber by the coupler;

wherein each optical output fiber is coupled to a respective output interface, each output interface being configured to electrically connect to a different DVI or HDMI receptacle of two different digital sink devices, each output interface comprising an optical receiver configured to receive the input optical signal from a respective one of the at least two optical output fibers and convert the input optical signal to an output serialized electronic video signal that is received by respective deserializers of the respective output interface, each deserializer deserializing the respective output serialized electronic video signal back into the TMDS electrical signals that are suitable for use by a respective one of the DVI or HDMI digital sink devices, wherein the digital optical interface device is configured to communicate the same signals from the digital source device to at least two digital sink devices.

2. A digital interface device according to claim 1, wherein the coupler is configured to direct different input optical signals to different optical outputs or the coupler is configured to direct the same input optical signal to multiple optical outputs.

3. A digital interface device according to claim 1, wherein:
the input interface is part of an input optical cable;
each output interface is part of an output optical cable; and
the coupler is part of a nexus, the nexus being configured to electrically or optically couple the input optical cable to each of the output optical cables.

4. A digital interface device according to claim 1, wherein at least one of the interfaces comprises means for transmitting and receiving optical signals.

5. A digital optical network comprising:
an input interface configured to electrically couple to a DVI or HDMI receptacle of a DVI or HDMI source device, the input interface including:
an optical transmitter configured to convert electrical transition minimized differential signaling (TMDS) signals and a control signal received from the DVI or HDMI source device into an optical signal;
a serializer for serializing the electrical TMDS signal along with the control signal into an electrical serialized TMDS signal;
an input optical fiber optically coupled to the optical transmitter to receive the optical signal;
a coupler configured to couple the optical signal with at least two of multiple output optical fibers coupled to the coupler; and
at least two output interfaces, each of the at least two output interfaces being configured to electrically couple to a respective DVI or HDMI receptacle of at least two DVI or HDMI sink devices, each of the at least two output interfaces including:
an optical receiver configured to receive and convert the optical signal back into the electrical TMDS signal; and
a deserializer for deserializing the electrical serialized TMDS signal back into the electrical TMDS signals and control signal and configured to transmit the electrical TMDS signals and control signal to a respective one of the DVI or HDMI sink devices, wherein the digital optical network is configured to transmit all of the signals generated by the DVI or HDMI source device to both of the DVI or HDMI sink devices via optical transmission.

6. A digital optical network according to claim 5, wherein the coupler is an electronic coupler and the optical signal is converted back to an electrical signal by an optical receiver before it is converted to an optical signal by an optical transmitter and coupled to the at least one of multiple output optical fibers.

7. A digital optical network according to claim 6, wherein the optical signal is converted to an electrical signal prior to being received by the electronic coupler, and wherein the electronic coupler couples the electrical signal to multiple optical transmitters which convert the electrical signal to multiple optical signals and transmit the multiple optical signals to multiple output fibers.

8. A digital optical network according to claim 5, wherein the coupler is a part of a nexus configured to couple the input optical fiber with the at least one of multiple output optical fibers.

9. A digital optical network according to claim 8, wherein the nexus is further configured to convert optical signals received from the input optical fiber into electrical signals, split the electrical signal into at least two electrical signals, and couple the electrical signals to the at least two output interfaces.

10. A digital optical network according to claim 8, wherein the nexus is further configured to convert the electrical signals to optical signals and couple the optical signals to the output interfaces.

11. A digital optical network according to claim 5, wherein at least one of the input interface and/or one of the second interfaces includes:
a VCSEL;
a monitor optical receiver for monitoring the output of the VCSEL;
a modulation laser driver configured to modulate a bias drive current supplied to the VCSEL; and
a TO-Can package encasing the VCSEL, the monitor optical receiver, and the modulation laser driver.

12. A digital optical network according to claim 5, wherein the optical network transmits signals in both a first direction and a second direction across the input optical fiber, the second direction being opposite to the first direction, wherein:
the input interface is configured to couple the input optical fiber for bidirectional communication to the DVI or HDMI source device; and
the second interfaces are configured to couple the optical network for bidirectional communication with the DVI or HDMI sink devices.

13. A digital optical network according to claim 12, wherein at least one of, or any combination of, the input interface and the second interfaces includes an optoelectronic device for detecting an incoming light beam along a light beam axis and for transmitting an outgoing light beam along the light beam axis, the optoelectronic device including:
an optical detector positioned along the light beam axis for receiving the incoming light beam and for detecting a first wavelength and/or range of wavelengths; and
the optical transmitter positioned along the light beam axis for transmitting the outgoing light beam, wherein the outgoing light beam includes a second wavelength and/or range of wavelengths.

14. A digital optical network according to claim 12, wherein the input interface further includes:
a first transmit optical subassembly (TOSA) configured to convert the electrical serialized signal into an optical signal, and transmit the optical serialized signal onto the first end of the input optical fiber;

a first receive optical subassembly (ROSA) configured to receive a return optical signal from the input optical fiber; and wherein the second interfaces further include:
second ROSAs configured to receive the optical signal from second ends of the output optical fibers, and convert the optical signal into the electrical serialized signal;
second TOSAs configured to transmit the return optical signal to the output optical fibers.

15. A digital optical network according to claim 12, wherein at least one of the interfaces includes a bidirectional optical device comprising:
an optical port;
a wavelength splitter proximate to the optical port;
a light source proximate to the wavelength splitter; and
a detector proximate to the wavelength splitter,
wherein:
the wavelength splitter passes light having a first wavelength from the light source to the optical port; and
the wavelength splitter reflects light having a second wavelength from the optical port to the detector.

16. A digital optical network according to claim 5, wherein at least one of the input and/or output interfaces includes means for transmitting and receiving optical signals.

17. A digital electro-optical system configured to allow a digital source device to communicate with at least two digital sink devices, comprising:
an input interface including electrical contacts configured to receive electrical TMDS and control signals generated by the digital source device, the electrical input interface including a serializer configured to serialize the TMDS and control signals into a serialized electrical signal, and an optical transmitter configured to convert the serialized electrical signal to an optical signal;
an optical input fiber optically coupled to the optical transmitter and configured to receive the optical signal;
a coupler coupled to the input optical fiber and coupled to at least two output optical fibers for transferring the optical signal from the input optical fiber to the at least two output optical fibers;
a first output interface including a first optical receiver optically coupled to a first output optical fiber of the at least two output optical fibers and configured to convert the optical signal received from the first optical fiber to a first copy of the serialized electrical signal, the first output interface further including a first deserializer configured to deserialize the first copy of the serialized electrical signal into a first copy of the TMDS and control input signals, the first output interface further including electrical contacts configured to transmit the first copy of the electrical TMDS and control signals to a first digital sink device of the at least two digital sink devices; and
a second output interface including a second optical receiver optical coupled to a second output optical fiber of the at least two output optical fibers and configured to convert the optical signal received from the second optical fiber to a second copy of the serialized electrical output signal, the second output interface further including a second deserializer configured to deserialize the second copy of the serialized electrical signal into a second copy of the TMDS and control input signals, the second output interface farther including electrical contacts configured to transmit the second copy of the electrical output signals to a second digital sink device of the at least two digital sink devices, wherein at least one of the interfaces includes an optoelectronic device including:
a transmitter diode including a first p-n junction with a first p-layer and a first n-layer;
a first tunnel junction coupled monolithically to the transmitter diode, the tunnel junction including a heavily doped n+ layer and a heavily doped p+ layer; and
a first photodiode coupled monolithically to the first tunnel junction, the first tunnel junction including a second p-n junction.

18. A cable according to claim 17, wherein the coupler is configured to optically couple the input optical signal received from the optical input fiber to both output optical fibers.

19. A cable according to claim 18, wherein the coupler is configured to electrically couple the input optical signal received from the optical input fiber to the at least two output optical fibers by converting the input optical signal back into the serialized electrical signal and transmitting the serialized electrical signal to at least two outputs of the coupler where the at least two copies of the serialized electrical signal are converted into at least two optical signals and transmitted respectively to the at least two output optical fibers.

* * * * *